(12) United States Patent
Sugiura

(10) Patent No.: US 7,197,507 B2
(45) Date of Patent: Mar. 27, 2007

(54) COMMUNICATION INFORMATION RECORDING DEVICE

(75) Inventor: Takayuki Sugiura, Tokyo (JP)

(73) Assignee: Netagent Co., Ltd, Tokyo (JP)

( * ) Notice: Subject to any disclaimer, the term of this patent is extended or adjusted under 35 U.S.C. 154(b) by 590 days.

(21) Appl. No.: 10/148,463

(22) PCT Filed: Oct. 3, 2001

(86) PCT No.: PCT/JP01/08723

§ 371 (c)(1),
(2), (4) Date: May 30, 2002

(87) PCT Pub. No.: WO02/29579

PCT Pub. Date: Apr. 11, 2002

(65) Prior Publication Data

US 2002/0184190 A1 Dec. 5, 2002

(30) Foreign Application Priority Data

Oct. 3, 2000 (JP) ............................. 2000-341183

(51) Int. Cl.
*G06F 17/30* (2006.01)
*G06F 13/00* (2006.01)

(52) U.S. Cl. ........................ 707/102; 707/100; 709/206

(58) Field of Classification Search .................... 707/3; 709/203, 206, 232; 713/151, 154, 188, 201; 714/39; 345/581
See application file for complete search history.

(56) References Cited

U.S. PATENT DOCUMENTS

| 5,948,058 | A | * | 9/1999 | Kudoh et al. | 709/206 |
| 5,956,721 | A | | 9/1999 | Douceur et al. | |
| 6,311,210 | B1 | * | 10/2001 | Foladare et al. | 709/206 |
| 6,609,196 | B1 | * | 8/2003 | Dickinson et al. | 713/154 |
| 2005/0081059 | A1 | * | 4/2005 | Bandini et al. | 713/201 |

FOREIGN PATENT DOCUMENTS

JP 5-108841 4/1993
JP 7-231317 8/1995

OTHER PUBLICATIONS

Miwa, Yoshiko, Linux Magazine, Jul. 2001, pp. 108-113.
"Create Four Major Services of the Internet Yourself", Chia-chun Wang, Taipei: Gotop Information Inc. 1998.
CGI Programming with Perl and Visual Basic and C, Richard Bowen and Kevin O'Brien, Kings Information Co., Ltd., 2000.

* cited by examiner

*Primary Examiner*—Jeffrey Gaffin
*Assistant Examiner*—Hassah Mahmoudi
(74) *Attorney, Agent, or Firm*—Frommer Lawrence & Haug LLP; William S. Frommer; Thomas F. Presson

(57) ABSTRACT

The object of the present invention is to obtain the records of communication through the network. Monitoring the packet data passing through the objective network and adding the detection data corresponding to its type, and by storing the resultant in the analysis result database, the data can be simply and certainly read out after the completion of communications.

9 Claims, 20 Drawing Sheets

```
                              RESPONSE FROM SERVER
                             /
                            /              DATA12 RESPONSE DATA
                           /              /
                          ↙              ↓

220 ns.nd.to ESMTP Sendmail 8.9.3/3.7W;Thu, 4 Sep
2001 15:10:41+0900
250 ns.nd.to Hello[127.0.01],pleased to meet you
250 <tesuto@nd.to>...Sender ok
250 <test@example.com> ...Recipient ok
354 Enter mail,end with"."on a line by itself
250 PAA03665 Message accepted for delivery
221 ns.nd.to closing connection
```

RESPONSE FROM SERVER        DATA22 ELECTRONIC MAIL DATA

```
+OK QPOP(version 3.1)at test.test.co.jp starting.
+OK Password required for test.
+OK test has 5 visible messages(0 hidden)in 17355 octets.
+OK 5 17355
+OK uidl command accepted.
1 70'#!o>3!!WEP!!D&%#!
2 Y39"l4_1!!PXF!!L~4!!
3 hW+!!MD%#!Jn$!!F~'#!
4 @a0!!Hg,!!6hC"!;6W"!
5 GX$"!-Pa!!Sbm!!#nj"!

+OK 5 visible messages(17455 octets)
1 2780
2 2957
3 1908
4 2280
5 4397

+OK 86 octets
>From 1 Wed Sep 5 16:40:36 2001
Received:from smtp8.melma.com(smtp8.melma.com[203.174.71.97])
      by test.test.co.jp(8.9.3/3.7W/00112120)with SMTP id QAA28208
      for <test@test.co.jp>;Wed,5 Sep 2001 16:40:34 +0900
Received:(qmail 27918 invoked by uid 0); 5 Sep 2001 15:07:07 +0900
Received:from unknown (HELO send4.data-hotel.net) (10.0.15.166)
   by smtp8.melma with SMTP; 5 Sep 2001 15:07:07 +0900
Date: Wed,5 Sep 2001 15:05:31 +0900
From:melma!=?ISO-2022-JP?B?GyRCJUslZSE8JTkbKEI=?=<news@melma.com>
To:test@test.co.jp
Subject:=?ISO-2022-JP?B?GyRCIXoxPOw/JE4ycTxSJEs9UDJxGyhC?=
=?ISO-2022-JP?B?GyRCJCYhKkUsQC1ILzgrJTslXyVK1TxGQxsoQg==?=
=?ISO-2022-JP?B?GyRCPTghPyVhJWslXiUsRVBPPyVXJWwIPCVzJUghKhsoQg==?=
Mime-Version: 1.0
Message-Id:<384.17177.send4@melma.com>
Content-Type:text/plain;charset=iso-2022-jp
Content-Transfer-Encoding:7bit
X-MagazineID:melma.com magazine 1
X-Mailer:melma.com 3.1
Errors-To:magusererror-1-yoshida=test.co.jp@mailerror.melma.com
X-UIDL:K;C!!Z:U!!b"@"!,"a"!

melma:
(omitted)

+OK Pop sever at dns.kcs-inc.co.jp signing off.
```

S21 POP3 RESPONSE

S23 MAIL HEADER

S22 MAIL MAIN TEXT

S24 MAIL MAIN TEXT

S21 POP3 RESPONSE

FIG. 14

COMMUNICATION INFORMATION RECORDING DEVICE

TECHNICAL FIELD OF THE INVENTION

The present invention relates to a communication information recording device and is suitably applied to the case of confirming the communication information flowing into a network that becomes an object to be monitored after the completion of communications.

TECHNICAL BACKGROUND OF THE INVENTION

In the network that is constructed to transmit or receive information by using the applicable LAN (Local Area Network) in the plural number of terminal devices connected to the LAN, there may be cases where the existence or non-existence of the communication should be confirmed after the communication has been conducted.

For example, there may be cases where we want to confirm whether a network crime has been conducted or not from the inside of LAN network or the external network connected to the LAN network (e.g., Internet) and we want to obtain an evidence that the communication has been conducted (e.g., the evidence of electronic commercial transaction).

As a method to solve such problems, a method to provide software using the GUI (Graphical User Interface) for information recording only in each terminal device has been adopted. However, this has created complicated works when confirming the recorded information after the communication has been conducted.

DISCLOSURE OF THE INVENTION

The present invention has been done considering the above points and is proposing a communication information recording device capable of more easily confirming the communication information after its recording or transmission has been conducted.

To obviate such problems according to the present invention, receiving data of data stream D0 flowing in an objective network 2, and dividing the received data into session data for one communication D1, and selecting communication item data contained in the divided session data D1, (HTTP communication, SMTP communication, POP3 communication), (SMTP command MAIL FROM and RCPT TO), (POP3 command USER and APOP), (mail header From, Subject, To, and Cc), (HTTP request GET, POST, HEAD, DELETE, OPTIONS, PUT, LINK, UNLINK, TRACE, CONNECT), (HTTP header Content-Length, Host), the analysis result data will be formed. By adding Category=1, 2 . . . to these analysis result data and storing these in the analysis result database 11, the analysis result data can be selectively read out from the analysis result database 11 based on the detection data category=1, 2 . . . , and thus, the communication result of the objective network 2 can be confirmed.

By adding the detection data to the communication item data and storing these in the analysis result database 11, the data of a data stream flowing in the objective network 2 can be easily confirmed after the communication has been transmitted by using the detection data. Thereby, the communication information recording device capable of easily finding whether the crime has been conducted onto the objective network 2 or not, and capable of more easily securing the evidence that the communication has been conducted can be realized.

According to the present invention as described above, since the communication data passing through the objective network will be received, and the received communication data will be classified according to the data categories. And adding new detection data these will be stored in the analysis result database, the progress of communications using the objective network can be easily and certainly confirmed based on the analysis result data stored in this analysis result database. Thus, the communication information recording device capable of easily and surely giving the evidence on the network crime and the evidence of electronic commerce transaction can be realized.

BRIEF DESCRIPTION OF DRAWINGS

FIG. 14 is a schematic diagram showing the construction of electronic mail data DATA 22 (Response from server) of the POP3.

BEST MODE FOR CARRYING OUT THE INVENTION

The present invention will be described in detail with reference to the accompanying drawings.

(1) General Construction

Figure 1:
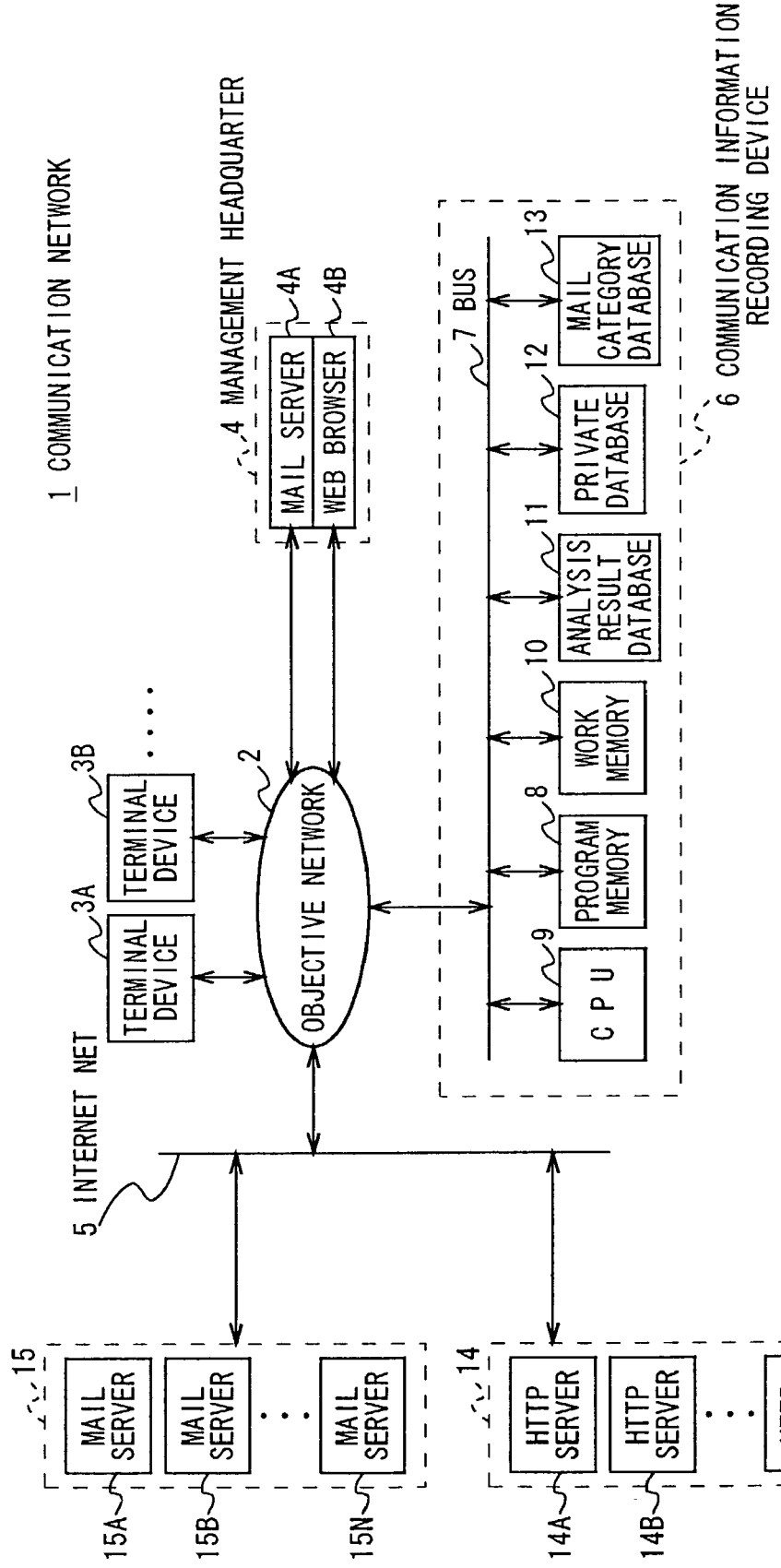
FIG. 1 is a block diagram showing the general construction of a communication information recording device according to the present invention.

In FIG. 1, 1 generally shows communication networks in which an objective network 2 comprising the LAN network is connected to Internet net 5.

The objective network 2 is connected to the plural number of terminal devices 3A, 3B . . . and these terminal devices 3A, 3B . . . , communicate electronic mail information with the mail server 4A and mail servers 15A, 15B . . . provided in the management headquarter 4 with the Web browser 4B, and simultaneously the mail server 4A communicates electronic mail information between external mail servers 15A, 15B . . . through the Internet net 5 connected to the objective network 2.

The terminal devices 3A, 3B . . . communicate Web pages between HTTP servers 14A, 14B . . . through the objective network 2 by using the HTTP protocol.

With this arrangement, the electronic mail information and Web page information flown into the objective network 2 will be monitored by the communication information recording device 6 connected to the objective network 2.

Figure 2:
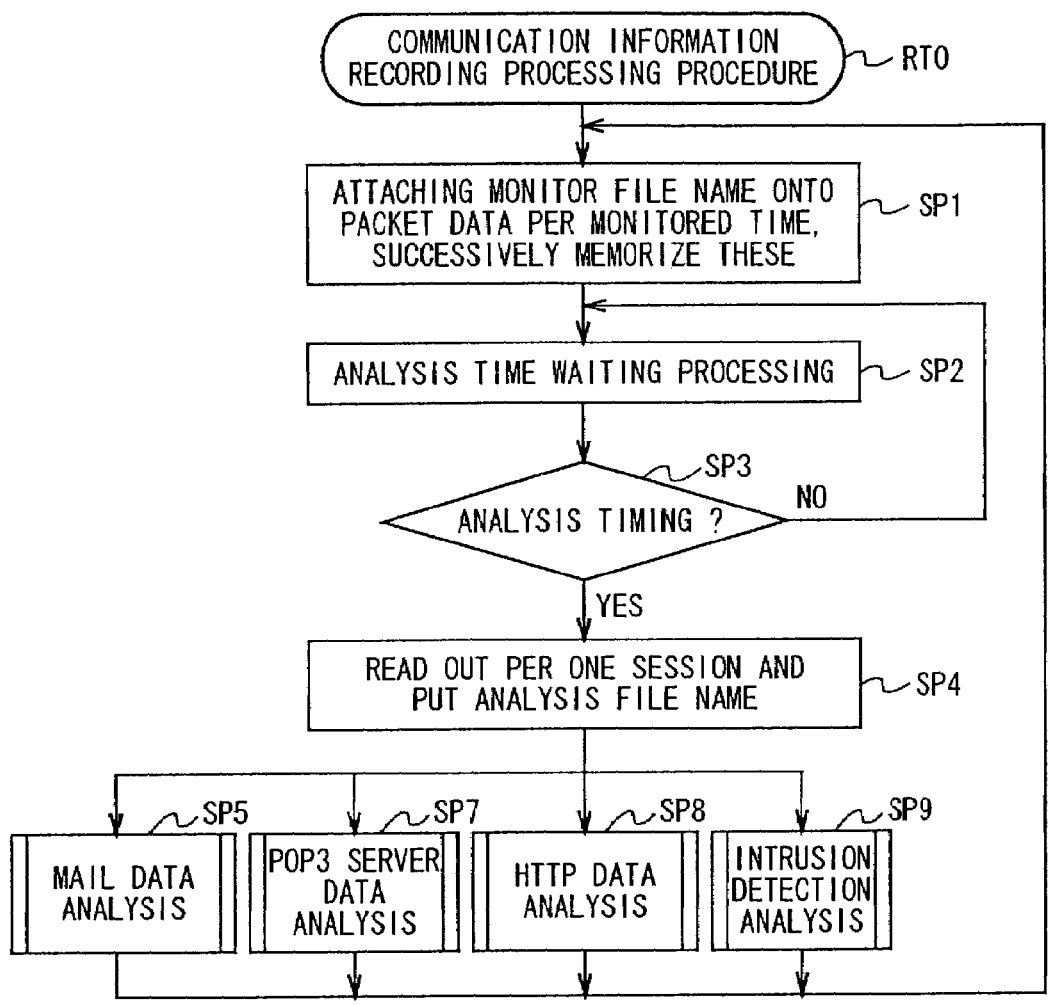
FIG. 2 is a flow chart showing the communication information recording processing procedure of a communication information recording device 6 of FIG. 1.

Since the central processing unit (CPU) 9 connected to the program memory 8 executes communication information recording program through a bus 7 using a work memory 10, the communication information recording device 6 executes the analysis processing on the electronic mail information and Web page information flowing into the objective network 2 according to the communication information recording processing procedure RT0 shown in FIG. 2, and stores the analysis result data showing the contents of communication information in the analysis result database 11 via the bus 7.

(2) Communication Information Recording Processing Procedure

When the CPU 9 of the communication information recording device 6 enters into the communication information recording processing procedure RT0 of FIG. 2, it successively captures packet data containing electronic mail information and Web page information flowing in the objective network 2 at the step SP1, and stores these into the work memory 10.

Figures 3, 7:
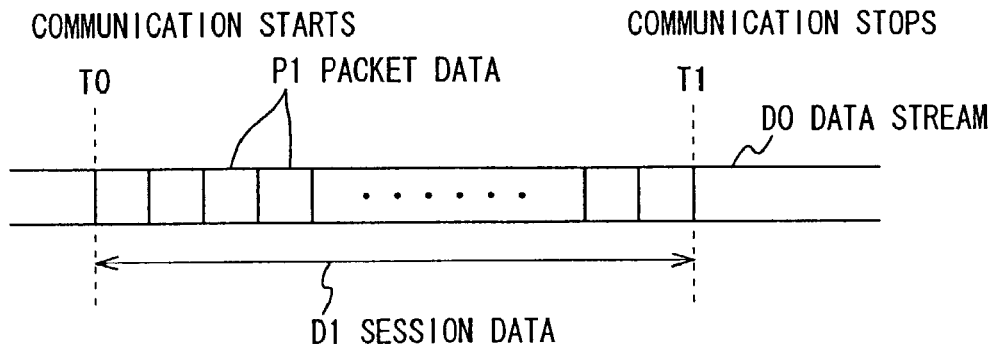
FIG. 3 is a schematic diagram showing the construction of electronic mail information flowing in the objective network 2 of FIG. 1.
FIG. 7 is a schematic diagram showing the construction of response data DATA12 (Response from server) to be processed in FIG. 4 and FIG. 5.

As shown in FIG. 3, since the packet data P1 continuously flow in from the communication start point T0 to the communication stop point T1 during the communication for a single time, the data stream D0 transmits the session data D1 showing one data.

On the other hand, the CPU 9 of the communication information recording device 6 divides the data stream of this data stream D0 per the predetermined monitor time and adding the monitor file names, memorizes these in the work memory 10.

While the packet data P1 flowing in the objective network 2 will be captured in the work memory 10 per the predetermined monitor time, the CPU 9, after conducting the analysis time waiting processing at the step SP2, and waiting till the analysis time point arrives, at the step SP3, cuts out the packet data captured in the work memory 10 per one session and adds the analysis file name.

Then, the CPU 9 executes the analysis subroutine of SMTP mail data on the electronic mail information to which analysis file names are added according to the type of electronic mail information captured at the step SP5, or it executes the analysis subroutine of the POP3 mail data at the step SP7.

At the step SP8, the CPU 9 executes the analysis subroutine of HTTP, and at the step SP9, it executes the intrusion detection analysis subroutine.

Thus, the CPU 9 terminates the analysis on the electronic mail information and Web page to which the monitor file names are attached at the step SP1, and returning to the step SP1, it repeats the analysis processing on the following monitor time.

As a result, in the communication information recording device 6, when the terminal devices 3A, 3B . . . transmit/receive electronic mails via the mail server 4A, or when the terminal devices 3A, 3B . . . read out electronic mail information from the mail server 4A and mail servers 15A, 15B . . . , or when it receives Web page from the HTTP servers 14A, 14B . . . of the Internet net 5 from terminal devices 3A, 3B . . . via the objective network 2, the communication information recording device 6 receives the electronic mail information and Web page information flowing in the objective network 2, and stores the analysis result in the analysis result database 11.

(3) Mail Data Analysis Processing Procedure

Figure 4:
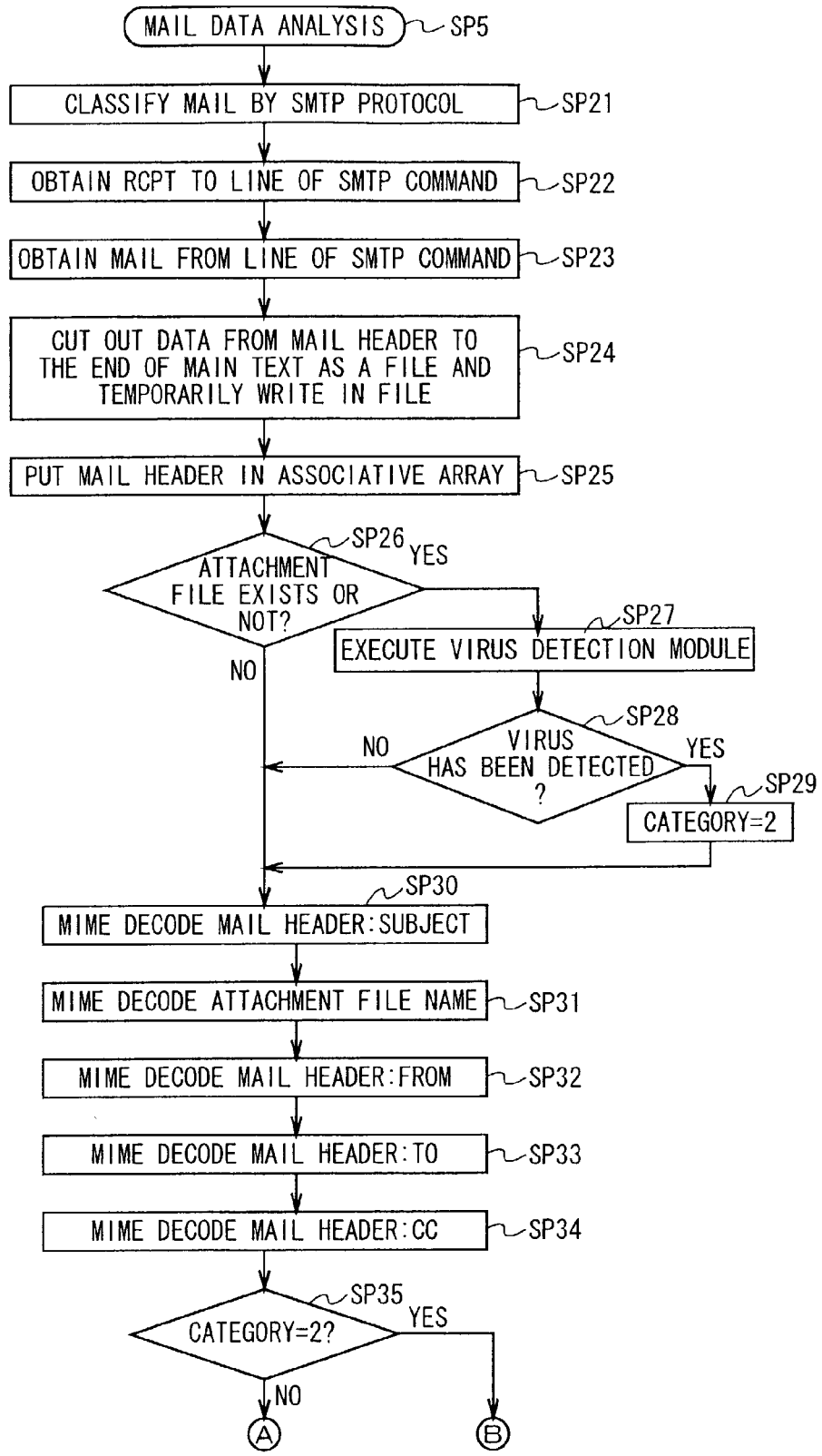
FIG. 4 is a flow chart showing the detailed construction of the mail data analysis step SP5 of FIG. 2.
Figure 5:
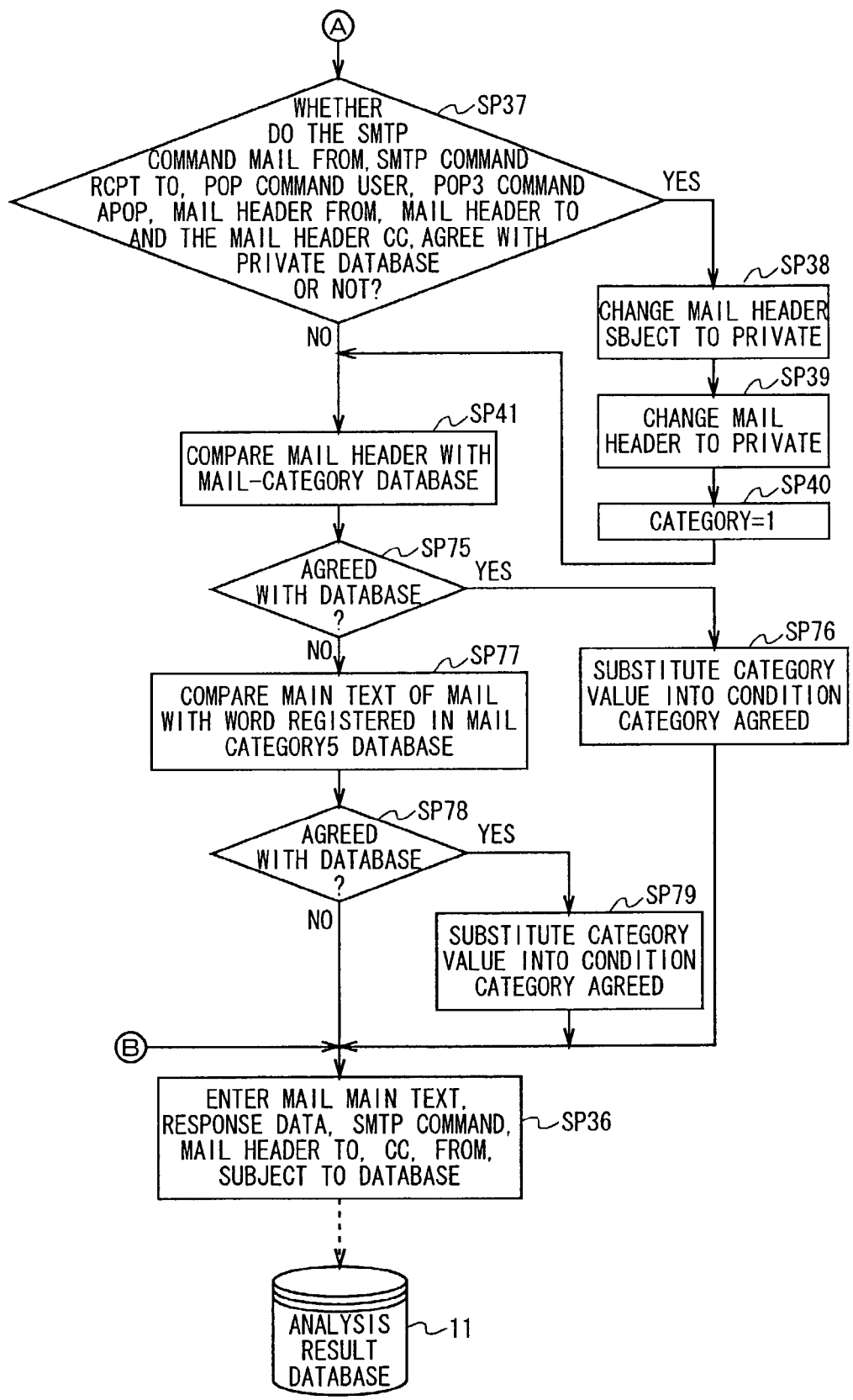
FIG. 5 is a flow chart showing the detailed construction of mail data analysis step SP5 of FIG. 2.

The communication information recording device 6 executes the mail data analysis processing procedure shown in FIGS. 4 and 5 at the mail data analysis processing routine SP5 of FIG. 2.

The processing of this mail data analysis processing routine SP5 will be conducted in the case where the electronic mail information flowing in the objective network 2 is the electronic mail information transferred based on the simple mail transfer protocol (SMTP). And this simple mail transfer protocol (SMTP) mail is formed of electronic mail data DATA11 of FIG. 6 as a request data to the mail server 4A.

When the mail server 4A receives this SMTP mail, the mail server 4A transmits the data of FIG. 7 as a response data DATA12.

Figure 6:
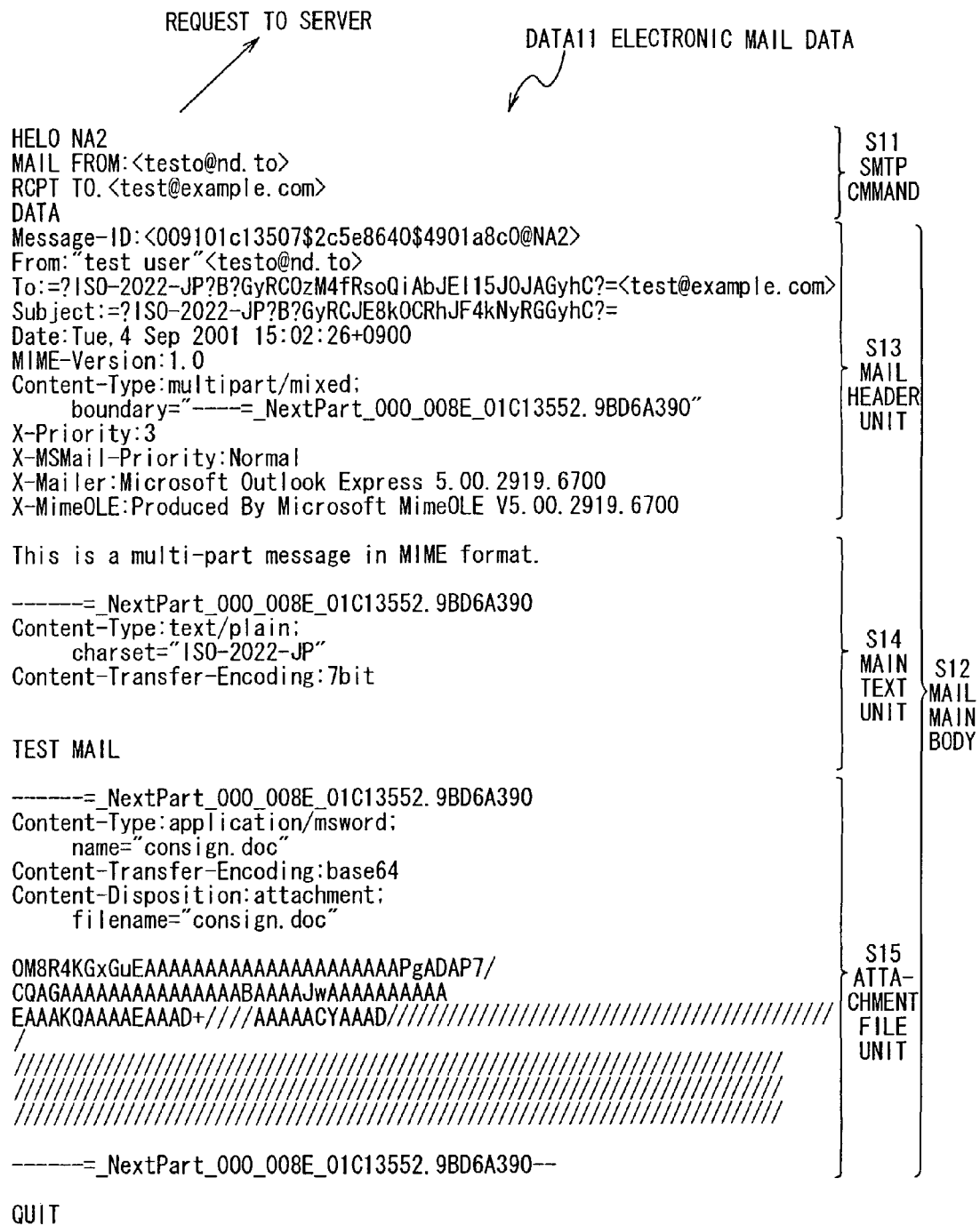
FIG. 6 is a schematic diagram showing the construction of electronic mail data DATA11 (Request to server) to be processed in FIG. 4 and FIG. 5.

In the case of SMTP electronic mail data DATA11 of FIG. 6, it has the SMTP command S11 in the first 4 lines from the top, and has the mail main body S12 from the following line to ".".

Furthermore, the mail main body S12 comprises a mail header unit S13, main text unit S14 and an attachment file unit S15.

When the CPU 9 enters the mail data analysis processing routine SP5 of FIG. 4, after dividing the mail using the SMTP protocol at the step SP21, successively obtains "RCPT TO" line and "MAIL FROM" line in the SMTP command S11 (FIG. 6) at the steps SP22 and SP23. And thus, it obtains the data showing that the data is an electronic mail from the name of mail sender to the name of addressee.

Then, at the step SP24, the CPU 9 cuts out from the mail header S13 through the end of main text S14 as one file, and by writing this into the file of the work memory 10 temporarily and putting the mail header in the associative array at the step SP25, it makes each item of the mail header can be referred.

Then next, the CPU 9 judges whether there exist any attachment files or not at the step SP26, and when an affirmative result is obtained, it moves to the step SP27 and executes the virus detection module and simultaneously, judges whether the virus is detected or not at the step SP28.

If an affirmative result is obtained at this virus detection step SP28, the CPU 9 judges that the electronic mail is Category=2 at the step SP29 and moves to the step SP30.

Here, the reason for categorizing the electronic mails received is that by classifying these electronic mails into categories according to the contents of the electronic mails and storing in the analysis result database 11, these data can be read based on the result of categorization when reading contents of the analysis result database 11 after they are communicated, and thus, this makes the data of the analysis result database 11 can be read out easily.

Thus, the CPU 9 extracts virus if there exists from the electronic mail having the attachment file, and classifies the category of the electronic mail into Category=2.

On the other hand, if the CPU 9 judges that there is no attachment file at the step SP26, or when virus has not been detected at the step SP28, the CPU 9 skips the step SP29 and moves to the step SP30.

The processing of this step SP30 is the processing to decode the "Subject" (title) (i.e., to change from 7 bits to generally readable 8 bits (MIME decoding)) in the mail header S13 of the SMTP electronic mail DATA11 (FIG. 6). And then, at the step SP31, the CPU 9 decodes "Filename" (attached file name), and at the following step SP32, the CPU 9 decodes "From" item of the mail header unit S13, and at the following step SP33, it decodes "To" item of the mail header unit S13 and decodes "Cc" item of the mail header unit S13 at the following step SP34.

By conducting the processing described above, the CPU 9 will find the SMTP mail comes from who and goes to whom, and Cc copy should be sent to whom, and as well as knowing the title and attachment file name, it knows the existence or non-existence of virus.

Under such circumstances, the CPU 9 judges whether the category of the electronic mail is "Category=2" or not at the step SP35. And when an affirmative result is obtained, it moves to the step SP36 (FIG. 5) and executes the processing (on the SMTP mail in which virus is detected) to enter the mail main text S14 response data DATA12, SMTP command S11, and "To" item, "Cc" item, "From" item, "Subject" item of the mail header S13 into the analysis result database 11 as the communication item data to show the communication contents.

On the other hand, if a negative result is obtained at the step SP35 (FIG. 4), this means that the SMTP mail has no virus, and at this moment, the CPU 9 moves to the step SP37 and judges whether the SMTP command "MAIL FROM" item, SMTP command "RCPT TO" item, POP3 command "USER" item, POP3 command "APOP" item, mail header "From" item, mail header "To" item and the mail header "Cc" item agree with the private database 12 or not.

Here the private database 12 means that other persons except persons registered in the private database 12 are not allowed to read the contents of the SMTP electronic mail.

If an affirmative result is obtained at the step SP37, this means that other persons would not be allowed to read the contents of the SMTP electronic mail. And at this moment at the step SP38, as well as changing the "Subject" item of the mail header to private, the CPU 9 changes the "To" item of the mail header to private at the step SP39. Then at the step SP40, setting to "category=1", the CPU 9 moves to the following step SP41.

Thus, when the CPU 9 confirms that the SMTP mail is not allowed to be seen by other persons, it sets both the mail header "Subject" item and the mail header "To" item to private, and simultaneously, by regarding as "category=1", contents of the SMTP mail can be set not to be seen even after the electronic mail is transmitted.

On the other hand, if a negative result is obtained at the step SP37, this means that the SMTP mail is not prohibited from being seen, and at this moment, skipping the step SP38 through the step SP40, the CPU 9 moves to the step SP41.

This step 41 compares the contents of mail header with the value of "mail-category" set in advance in the mail category database 13 (FIG. 1) and categorizes these.

Figure 10:
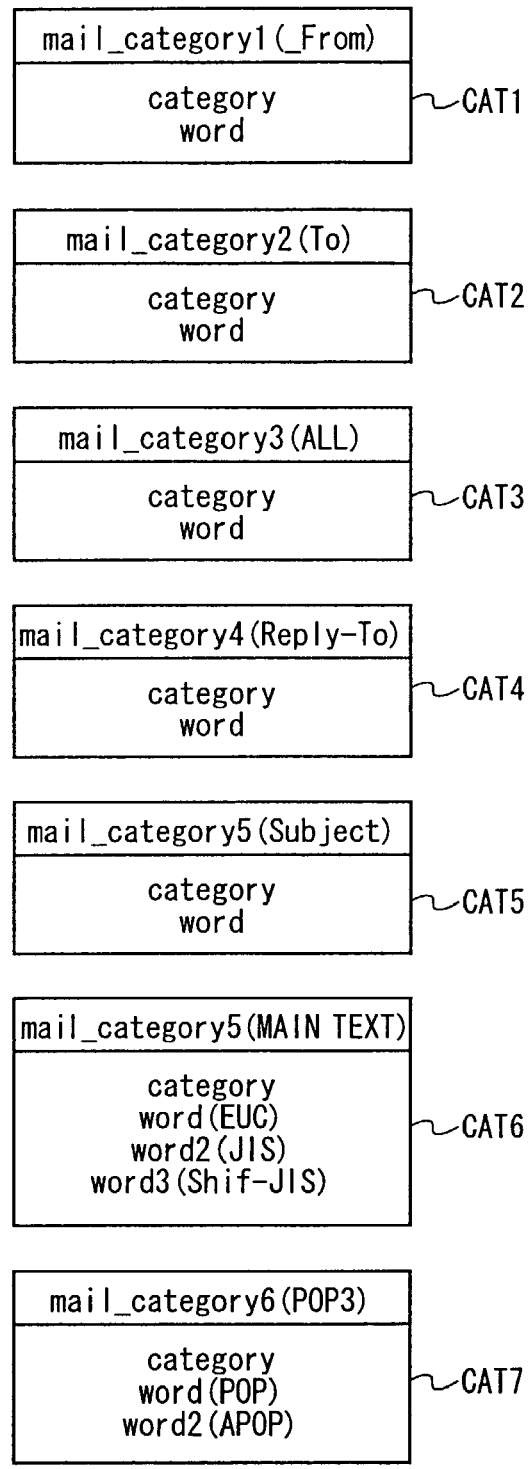
FIG. 10 is a schematic diagram showing the construction of mail category database to be used in the categorization processing procedure of FIGS. 8 and 9.

As shown in FIG. 10, the mail category database 13 sets groups of categories and words that belong to mail-categry1, 2, 3, 4 and 5 on the mail header "From" item, "To" item, all "ALL" item, "Reply-To" item and "Subject" item as the reference data.

Furthermore, on the "main text" item, the, mail category database 13 sets a group of category and words (word) (EUC), word2 (JIS) and word3 (Shift-JIS) as the reference data to rate the mail-category5.

Furthermore, on the POP3 item, the mail category database 13 has a group of category and word (POP) and word2 (APOP) as the reference data to judge the category6.

At this moment the CPU 9 judges whether the mail header of the SMTP mail agrees with the mail category database 13 or not at the step SP43 continued from the step SP41. And when an affirmative result is obtained, the CPU 9 moves to the step SP44, substitutes the value of category into the condition category agreed and moves to the steps SP36.

Here, the SMTP mail is the electronic mail transferred from a terminal device to the mail server 4A by the simple mail transfer protocol (SMTP). And the reference data of the header set to the mail category database 13 are "From" item and "To" item, and the CPU 9 judges whether these two items are agreed or not at the step SP75.

On the other hand, when a negative result is obtained at the step SP43, the CPU 9 compares the main text of the mail with the words registered in the mail-category5 of the main category database 13 at the steps SP45. And when the CPU 9 judges that these are agreed at the step SP46, substituting the value of category into the category agreed at the step SP47, it moves to the step SP36.

Besides, if a negative result is obtained at the step SP46, the CPU 9 moves to the step SP36 described above.

By executing the SMTP mail data analysis processing procedure SP5 of FIGS. 4 and 5, the CPU 9 judges whether the monitored electronic mail is allowed to be seen or not, and by judging that to what category the electronic mail belongs, it stores the resultant in the analysis result database 11.

(4) POP3 Data Analysis Processing Procedure

At the POP3 data analysis subroutine SP7 (FIG. 2), in the ease where the terminal devices 3A, 3B . . . read the mail pooled in the mail server 4A and mail servers 15A, 15B . . . , the CPU 9 of the communication information recording device 6 monitors electronic mail information flowing in the objective network 2 by the POP3 protocol (Post Office Protocol Version 3) according to the POP3 data analysis processing procedure SP7.

When the CPU 9 enters the POP3 data analysis processing procedure SP7, the CPU9 divides the mail based on the POP3 protocol at the step SP75.

Then, a request data DATA21 (shown in FIG. 13) of the electronic mail information based on the POP3 protocol will be transmitted to the mail server 4A from the terminal devices 3A, 3B . . . via the objective network 2. And as the response to this request, an electronic mail data DATA22 shown in FIG. 14 will be sent from the mail server 4A and mail servers 15A, 15B to the terminal devices 3A, 3B that sent out the request.

The electronic mail data DATA22 is formed of a POP3 response S21 and mail main body S22, and the mail main body SP22 comprises a mail header S23 and a mail main text S24.

Thus, the CPU 9, after dividing the mail in utilizing the POP3 response S21 at the step SP75, obtains "USER" item (user name is described) or "APOP" item (user name and password are described) of the POP3 command of the request data DATA21 at steps SP76 and SP77, and simultaneously, at the step SP78, it extracts data from the mail header S23 to the end of mail main text S24 of the electronic mail data DATA22 as one file, and temporarily stores it in the work memory 10.

Then, at the step SP79, after entering the mail header in the associative array and making each item can be taken out as occasion demands, the CPU 9 judges whether there exist any attachment files or not at the step SP80. And if an affirmative result is obtained, it executes the virus detection module at the step SP81. Then at the step SP82, if a judgment result that the virus has been detected is obtained, the CPU 9 judges that the electronic mail is category=2 at the step SP83, and moves to the following step SP84.

On the other hand, if the judgment that there is no attachment file is obtained at the step SP80 or virus has not been detected at the step SP82 is obtained, the CPU 9 moves to the step SP84 immediately.

At the step SP84, the CPU 9 decodes the "Subject" item of the mail header S23 from 7 bits to generally readable 8 bits (MIME decoding).

Similarly, at the following steps SP85, SP86, SP87 and SP88, the CPU 9 successively MIME decodes the "attachment file name" item, "From" item of mail header, "To" item of mail header, "Cc" item of the mail header.

Figure 12:
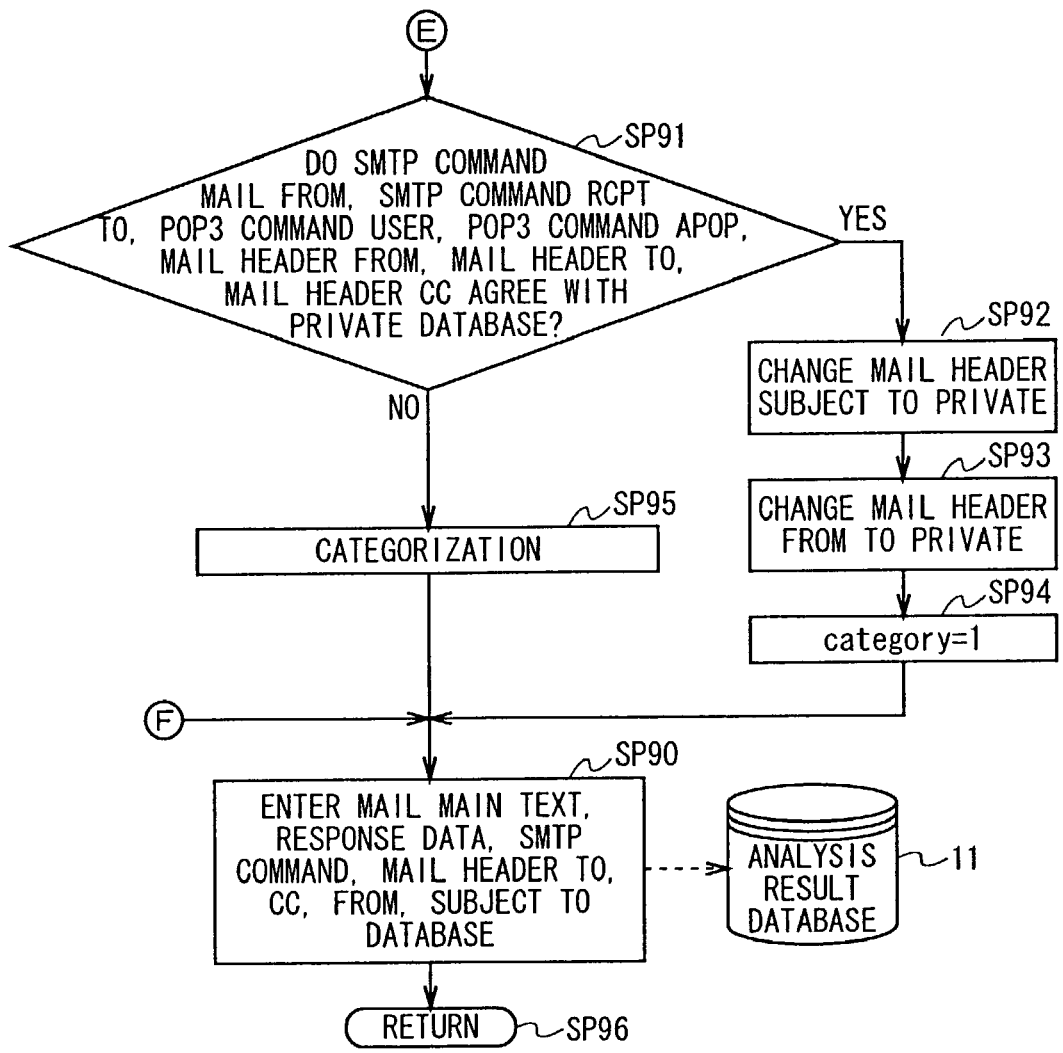
FIG. 12 is a flow chart showing the detailed construction of the POP3 data analysis step SP7 of FIG. 2 as is FIG. 11.

Then, at the step SP89, the CPU 9 judges whether the category of the electronic mail is Category=2 or not, and when an affirmative result is obtained, it moves to the step SP90 (FIG. 12) and enters "mail main text", "response data", "SMTP command", mail header "To", "Cc", "From" items and "Subject" item into the analysis result database 11.

Figure 11:
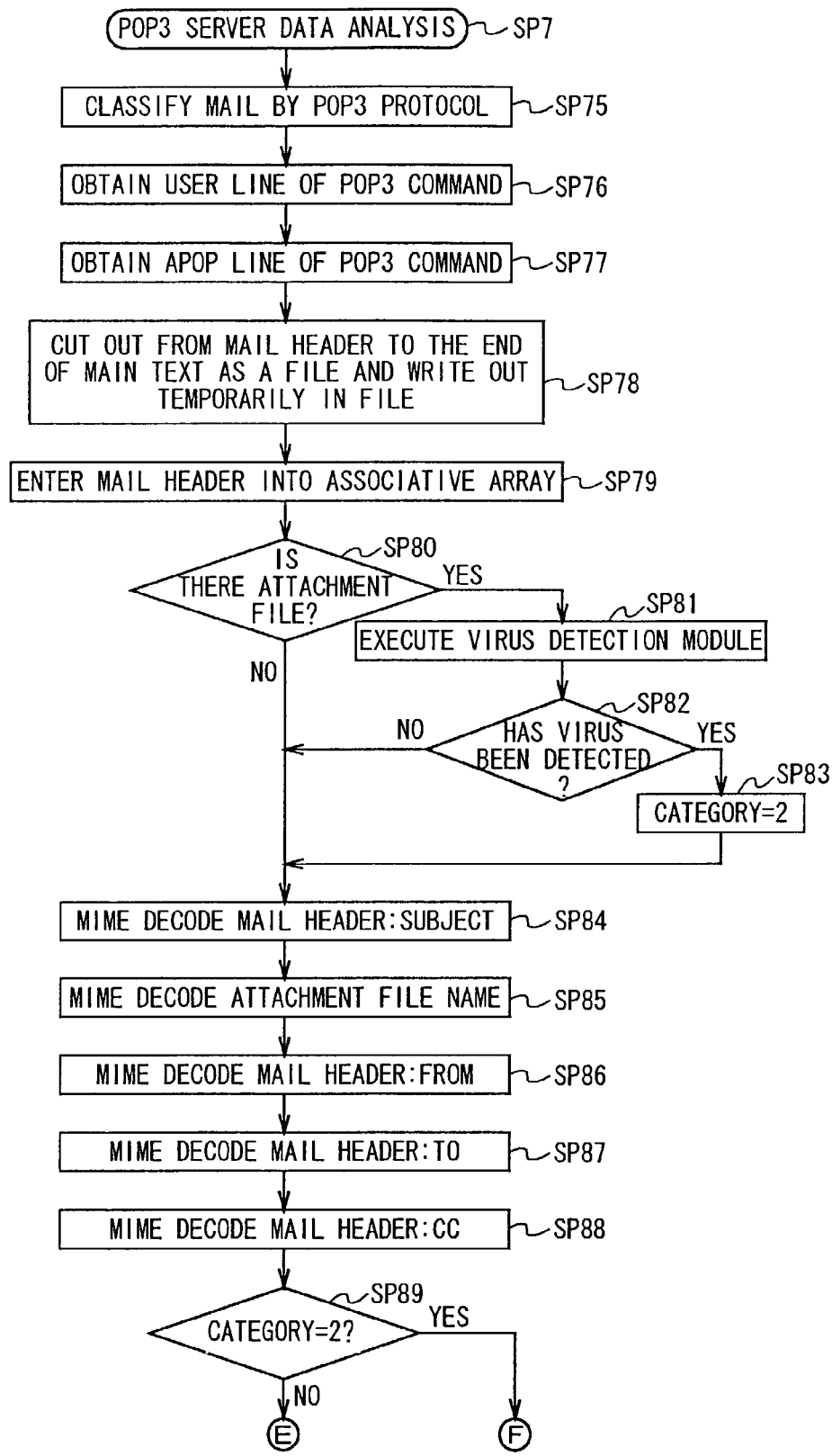
FIG. 11 is a flow chart showing the detailed construction of the POP3 data analysis step SP7 of FIG. 2.

On the other hand, if a negative result is obtained at the step SP89 (FIG. 11), the CPU 9, at the step SP91, judges whether one of items, SMTP command "MAIL FROM" item or "RCPT TO" item, or POP3 command "USER" item or APOP item, or mail header "From" item, "To" item, "Cc" item agrees with the private data stored in the private database 12.

At the step SP91, if an affirmative result is obtained, this means that the third person is not allowed to read the electronic mail, and at this moment, the CPU 9 changes the mail header "Subject" item to private data at the step SP92. And at the step SP93 after changing the "From" item to private data, it judges that the electronic mail category as category=1 at the step SP94, and moving to the step SP90, the CPU 9 registers this on the analysis result database 11.

On the other hand, if a negative result is obtained at the step SP91, this shows that the foregoing processing could not conduct the categorization. And at this moment, the CPU 9 executes the categorization processing subroutine SP42 at the step SP95.

Figure 8:
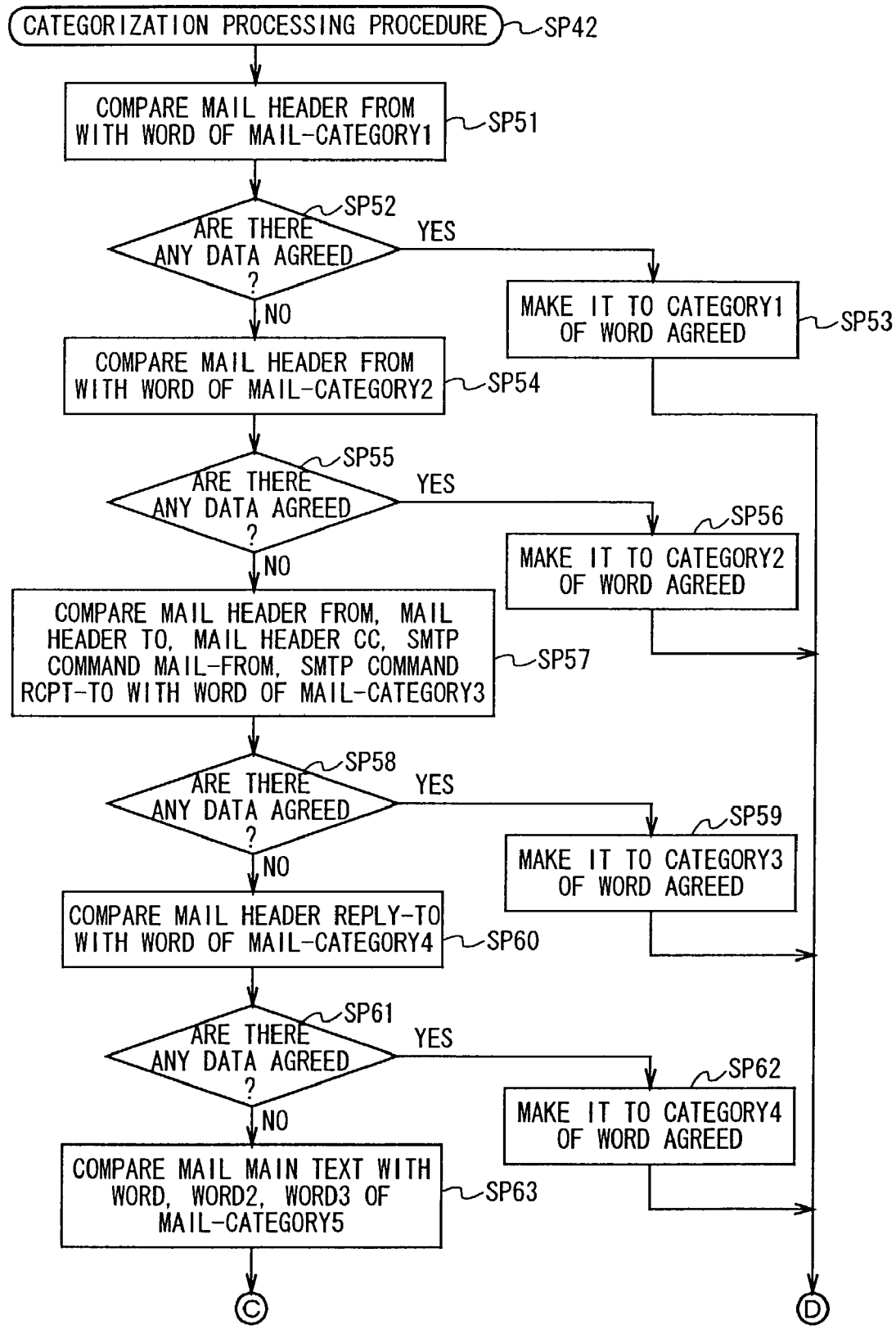
FIG. 8 is a flow chart showing the categorization processing procedure.
Figure 9:
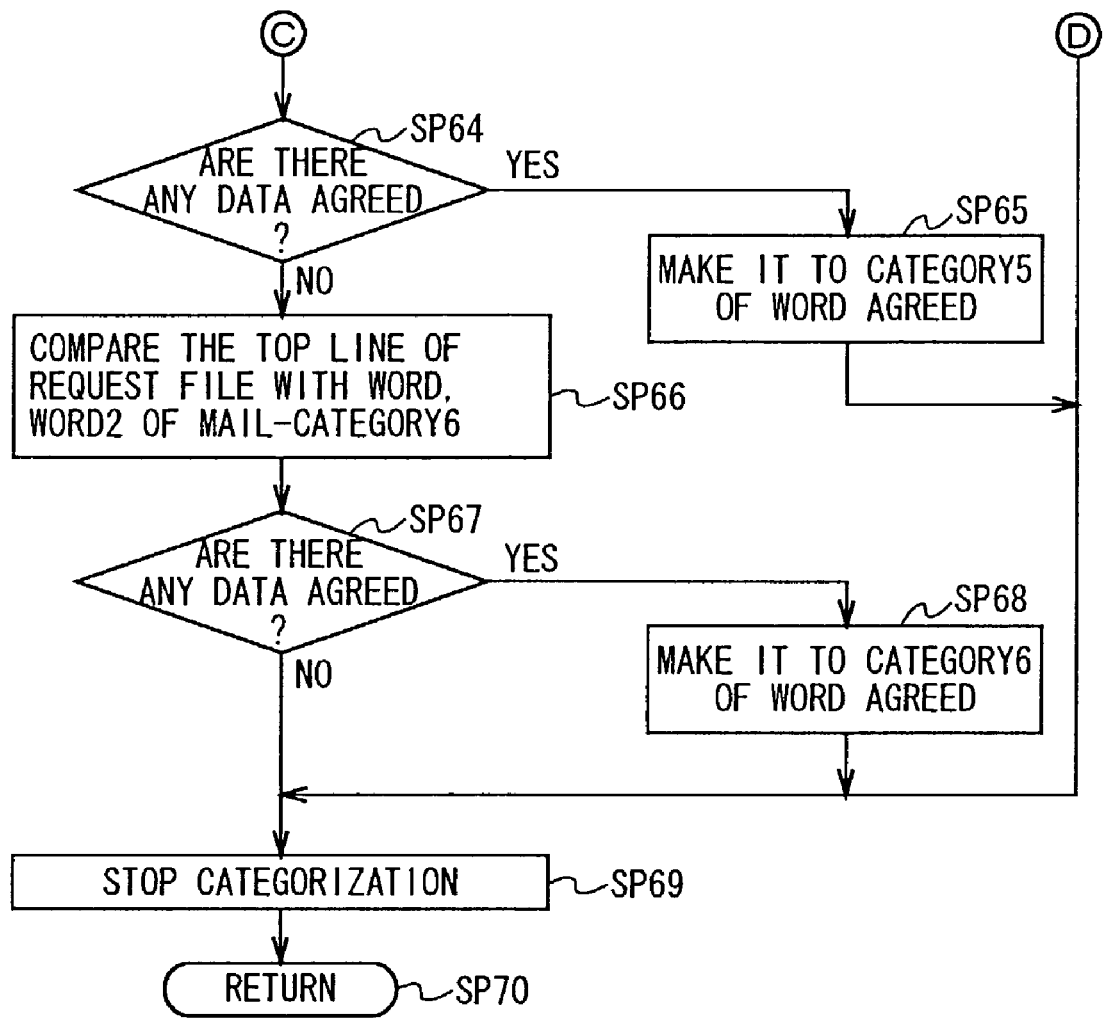
FIG. 9 is a flow chart showing the categorization processing procedure as is FIG. 8.

When the CPU 9 enters the categorization processing subroutine SP42, as shown in FIGS. 8 and 9, after comparing "From" item in the mail header of the mail with the word of "mail-category1" of the mail category database 13 at the step SP51, the CPU 9 judges whether there exist any data agreed or not at the step SP52. And when an affirmative result is obtained, the CPU 9 moves to the step SP53 and determines the category corresponding to the word agreed as the category1.

If a negative result is obtained at the step SP52, the CPU 9 compares "From" item in the mail header with the word of "mail-category2" at the step SP54. At the step SP55, if there exists data that is agreed, at the step SP56, the CPU 9 judges the category of the word agreed as category2.

Furthermore, at the step SP55 if a negative result is obtained, the CPU 9 compares "To" item, "To" item and "Cc" item in the mail header and "MAIL-FROM" item, "RCPT-TO" item in the SMTP command with the word of the mail-category3 of the mail category database 13. Moreover, at the step SP58 if there exists a data agreed, the CPU 9 judges the category corresponding to the word agreed as the category3 at the step SP59.

At the step SP84, the CPU 9 decodes the "Subject" item of the mail header S23 from 7 bits to generally readable 8 bits (MIME decoding).

Furthermore, if a negative result is obtained at the step SP59, the CPU 9 compares "Reply-To" item in the mail header with the word of the mail-category4 of the mail category database 13 at the step SP60. And at the step SP61, when it is found that there is agreement, the CPU 9 judges the category corresponding to the word agreed as the category4 at the step SP62.

Furthermore, if a negative result is obtained at the step SP61, the CPU 9 compares the mail main text of the SMTP mail with the word, word2 and word3 of the category5 of the mail category database 13 at the step SP63. And when it judges that there is an agreement in the step SP64 (FIG. 9), it judges the category corresponding to the word agreed as the category5 at the step SP65.

Furthermore, if a negative result is obtained at the step SP64, the CPU 9 compares the head line of the request file of the SMTP mail with the word, word2 of the mail-category6 of the mail category database 13 at the step SP66; and at the step SP67 if it is found that there is agreement, it judges the category of the word agreed as the category6 at the step SP68.

With this arrangement, if the judgment results of steps SP53, SP56, SP59, SP62, SP65 and SP68 are obtained, or if a negative result is obtained at the step SP67, the CPU 9 terminates the categorization processing at the step SP69, and returns to the main routine (FIG. 12) from the step SP70.

According to the categorization processing of this step SP95, mail information flowing in the objective network 2 will be simultaneously classified into the form of categorization that can be easily controlled by the manager of the management headquarter 4 who controls the objective network.

At this point, regarding the mail category database 13 of FIG. 10, the category numbers are attached respectively to one or the plural number of words having high priority on 6 items of the mail-category1 through mail category6. Thus, in the case of reading out the analysis result data stored in the analysis result database 11 from the Web browser 4B of the management headquarter 4, mail information with high priority can optionally read out.

The first categorization data CAT1 of the mail category database 13 is set as the mail-category1 onto one or multiple "names of mail transmitting ends" on the "From" item of the mail header unit with the category value".

The second categorization data CAT2 is set as the mail-category2 onto one or the plural number of "names of receiving ends" on the "To" item of the mail header unit with the category values.

Furthermore, the third categorization data CAT3 is set as the mail-categry3 onto one or multiple items, making a group of all items, i.e., the SMTP command "MAIL FROM" item, "RCPT TO" item and the mail header "From" item, "To" item, "Cc" item as a group of judgment information with the category values.

Moreover, the fourth categorization data CAT4 is set as the mail-category4 by attaching category values to one or multiple "Reply-To" (reply sending destination).

Moreover, the fifth categorization data CAT5 is set as the mail-category5 by attaching category values to one or multiple "Subject" item (title) of the mail header.

Moreover, the sixth categorization data CAT6 is set as the mail-category6 onto one or multiple "mail main text" item (i.e., registered characters) per each kanji code ERC, JIS, SHIFT-JIS.

Moreover, the seventh categorization data CAT7 is set as the mail-dategory7 onto one or more items in the word (POP), user name, or word2 (APOP), user name and password of the POP3 item (user name of mail server).

Thus, the CPU9, categorizing the electronic mail information monitored from various sides in utilizing the category classification data CAT1 through CAT7 of the mail category database 13, stores these in the analysis result database 11, and returns to the main routine communication information recording processing procedure RTO (FIG. 2) from the step SP96. Thus, the confirmation of electronic mail data from the analysis result database 11 can be easily conducted from the Web browser 4B of the management headquarter 4 as occasion demands.

(5) HTTP Data Analysis Processing Procedure

Figure 15:
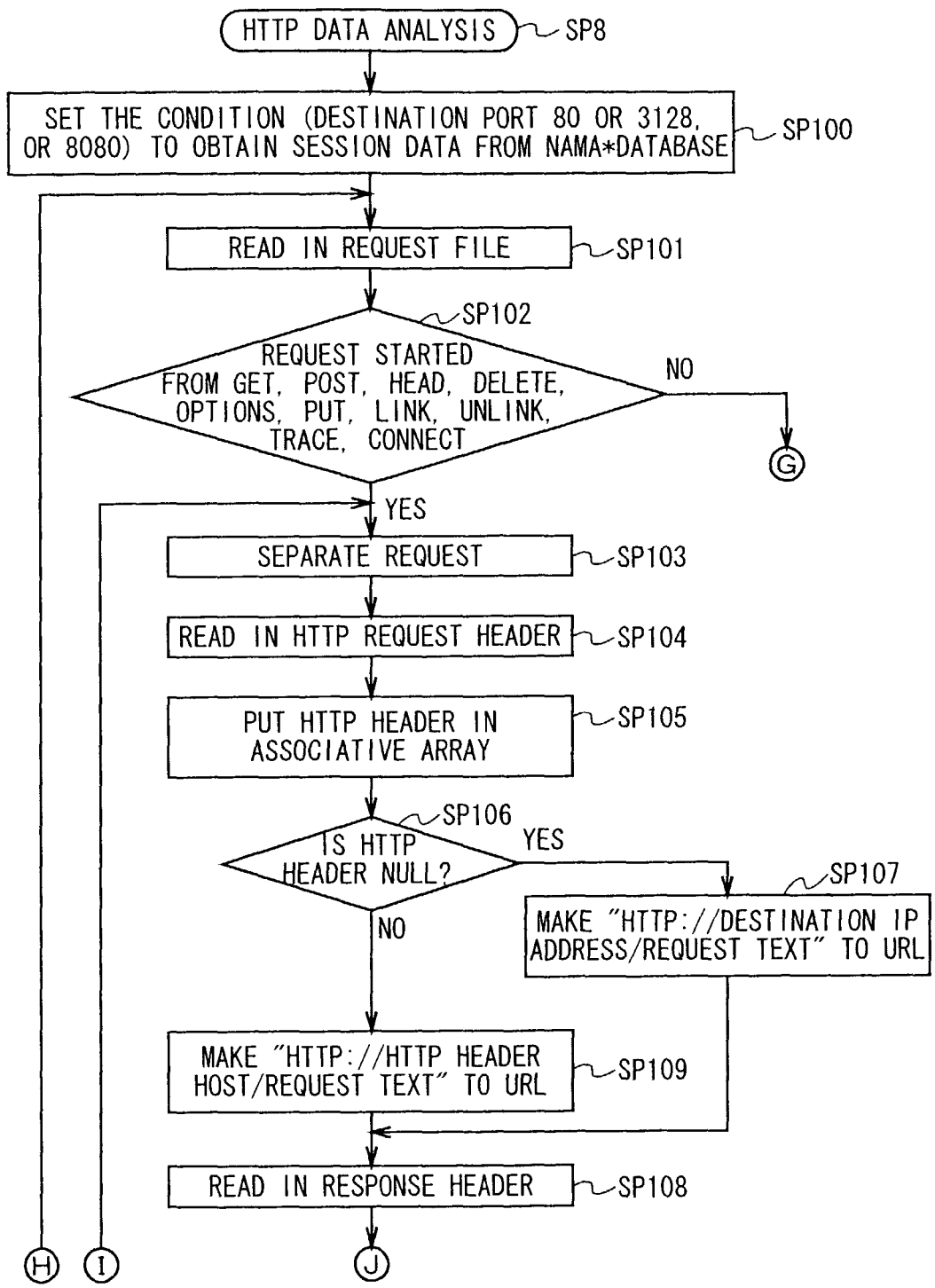
FIG. 15 is a flow chart showing the detailed construction of HTTP data analysis step SP8 of FIG. 2.
Figure 16:
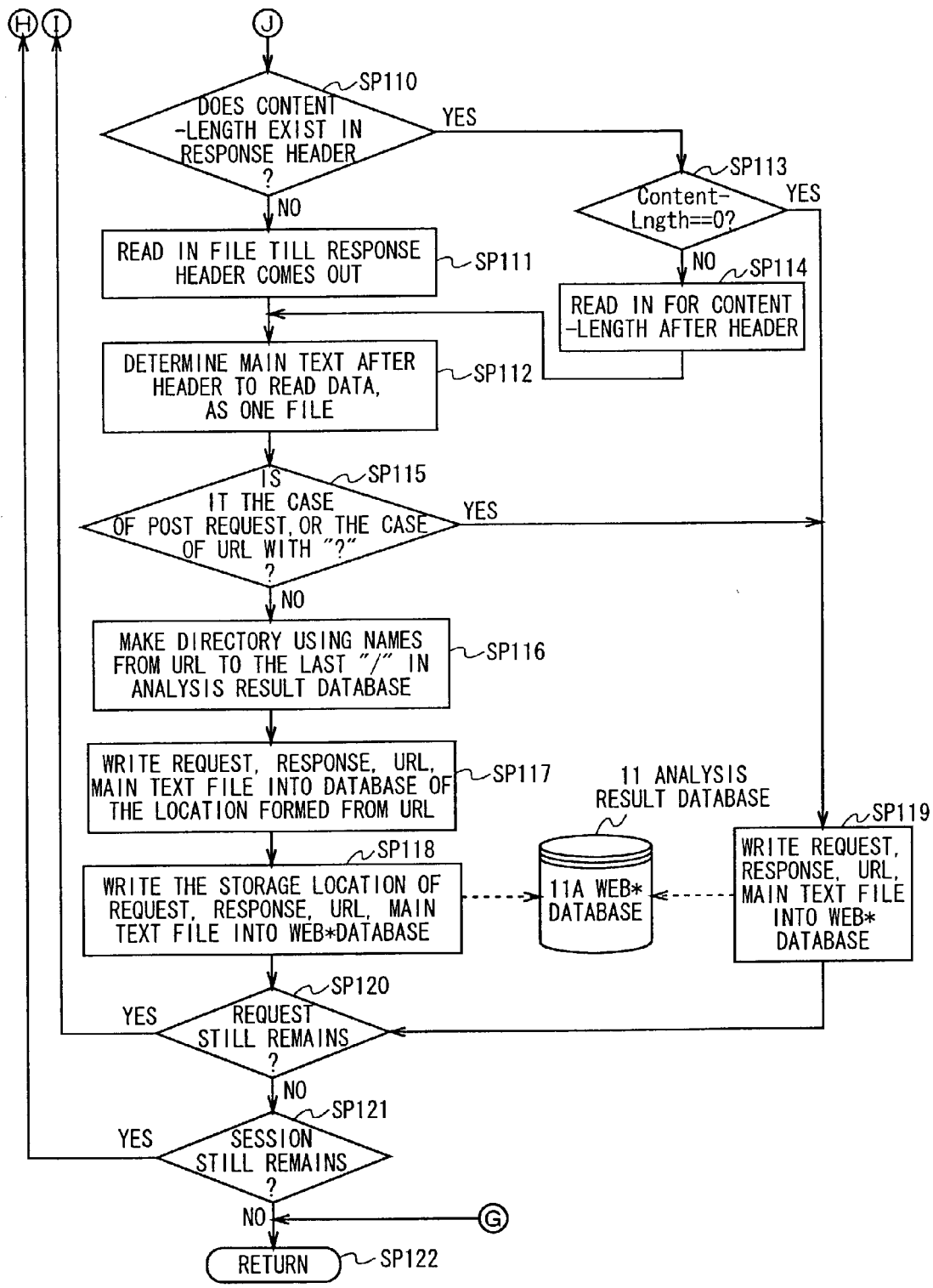
FIG. 16 is a flow chart showing the detailed construction of the HTTP data analysis step SP8 of FIG. 2 the same as FIG. 15.

The CPU 9 of the communication information recording device 6 executes "HTTP data analysis processing procedure" shown in FIGS. 15 and 16 at the HTTP data analysis step SP8 (FIG. 2).

When the CPU 9 enters the "HTTP data analysis processing procedure" SP8, it sets the condition to secure the session data from the name database at the step SP100.

In the case of this embodiment, when the terminal devices 3A, 3B . . . read Web page information from HTTP servers 14A, 14B . . . with three kinds of port numbers, 80, 3128 and 8080, the CPU 9 stores the Web page information in the analysis result database 11.

Request from the terminal devices 3A, 3B . . . starts from "GET", "POST", "HEAD", "DELETE", "OPTIONS", "PUT", "LINK", "UNLINK", "TRACE", "CONNECT" items.

For example, if the HTTP POST request is sent out from the terminal devices 3A, 3B . . . , the terminal devices 3A, 3B . . . send HTTP POST request data DATA31 to the HTTP servers 14A, 14B . . . via the objective network 2. And responding to this the HTTP servers 14A, 14B . . . transmit the HTTP POST response data DATA32 to the terminal devices 3A, 3B . . . via the objective network as shown in FIG. 19.

Figure 18:
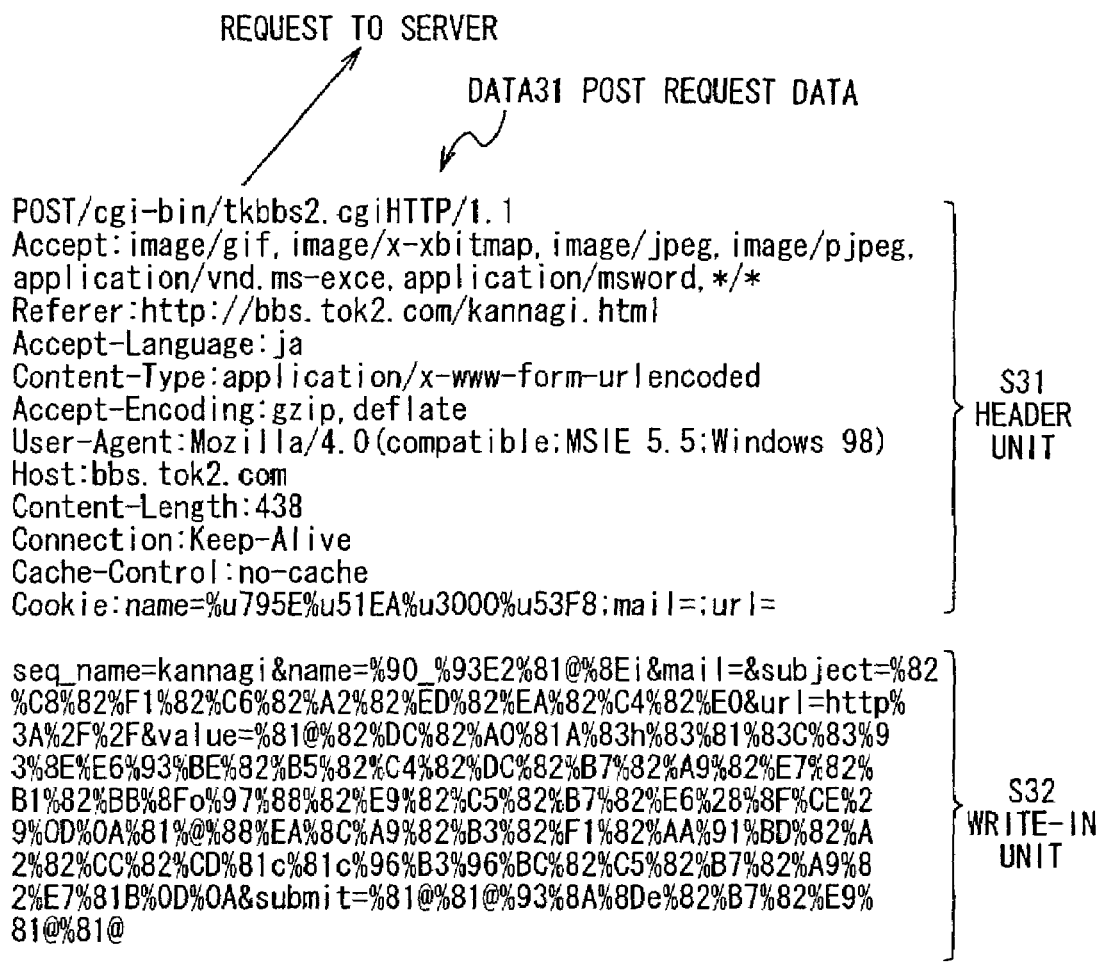
FIG. 18 is a schematic diagram showing the POST request data DATA31 (Request to server).

The HTTP POST request data DATA31 comprises a header unit S31 and a write-in unit S32 as shown in FIG. 18. And as well as sending Web page read-in information to the HTTP servers 14A, 14B . . . by the header unit S31, the condition to add the contents written in the write-in unit S32 to the Web page to be read and send out is added.

Figure 19:
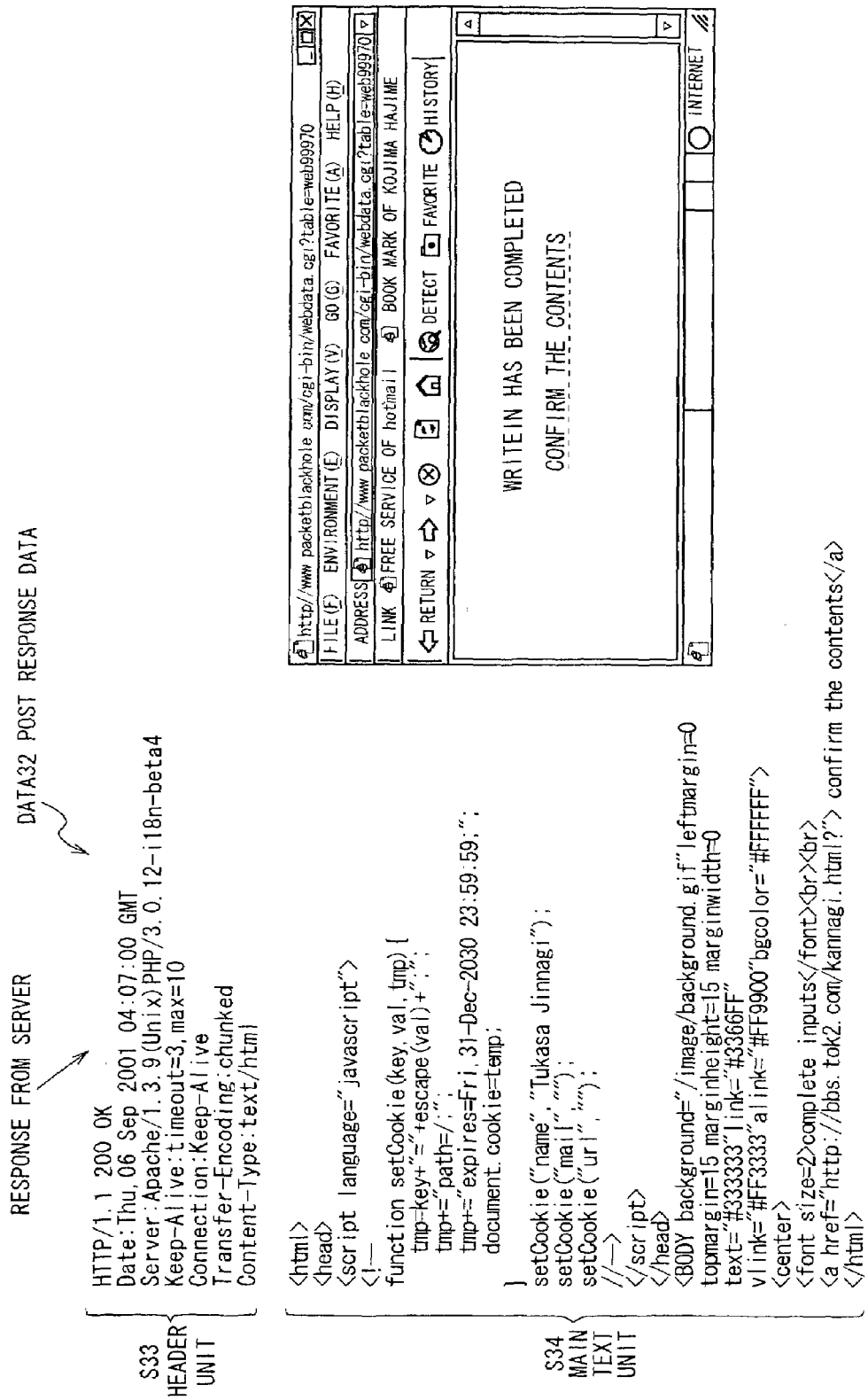
FIG. 19 is a schematic diagram showing the POST response data DATA32 (Response from server).

When the HTTP servers 14A, 14B . . . receive the HTTP POST request data DATA31, as shown in FIG. 19, the HTTP servers return the header part S33 and the main text part S34 formed of processed Web page information to the terminal devices 3A, 3B . . . that sent out the request as the HTTP POST response data DATA32.

Figure 20:
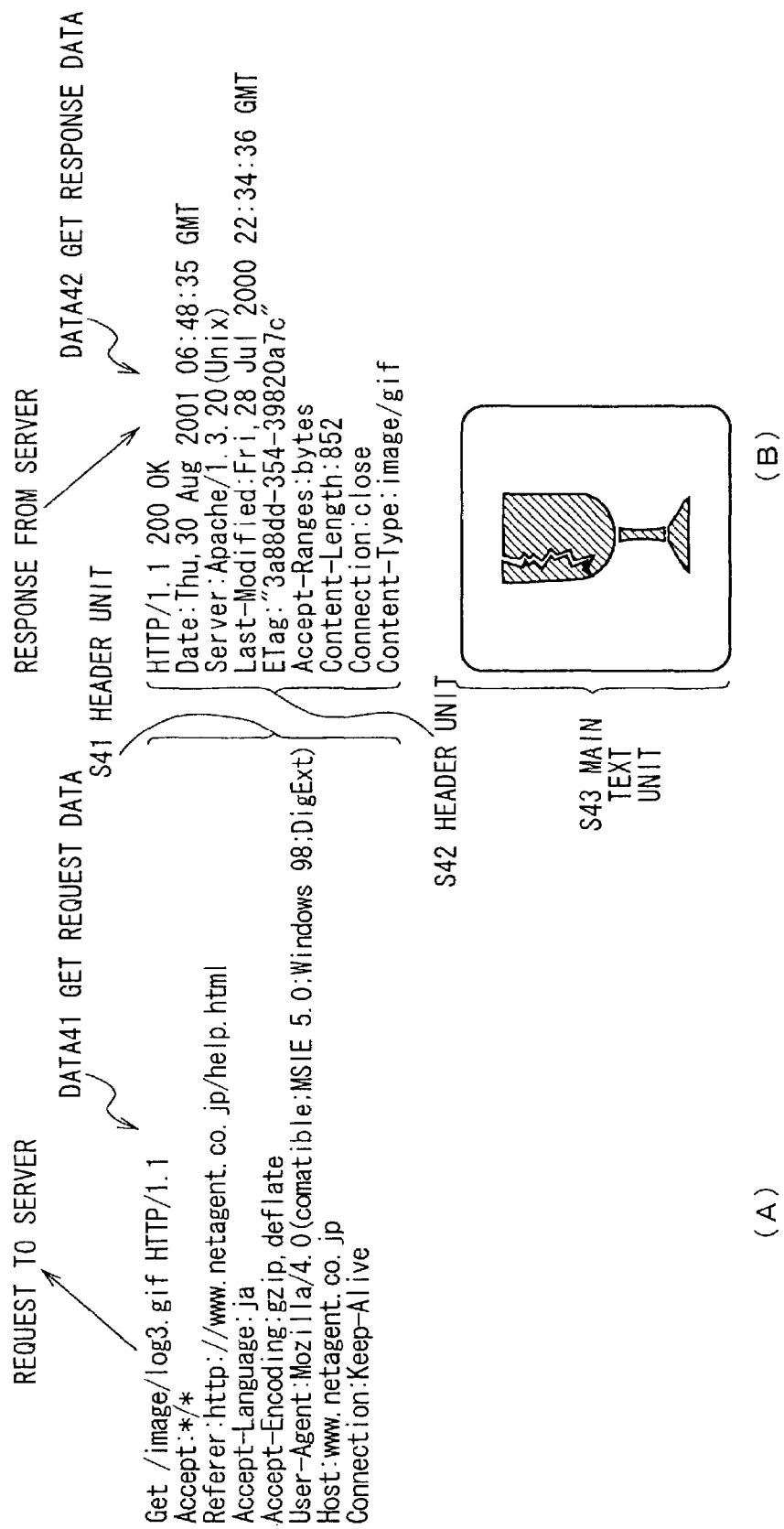
FIG. 20 is a schematic diagram showing the request data DATA41 and response data DATA42 of the GET request.
Figure 21:
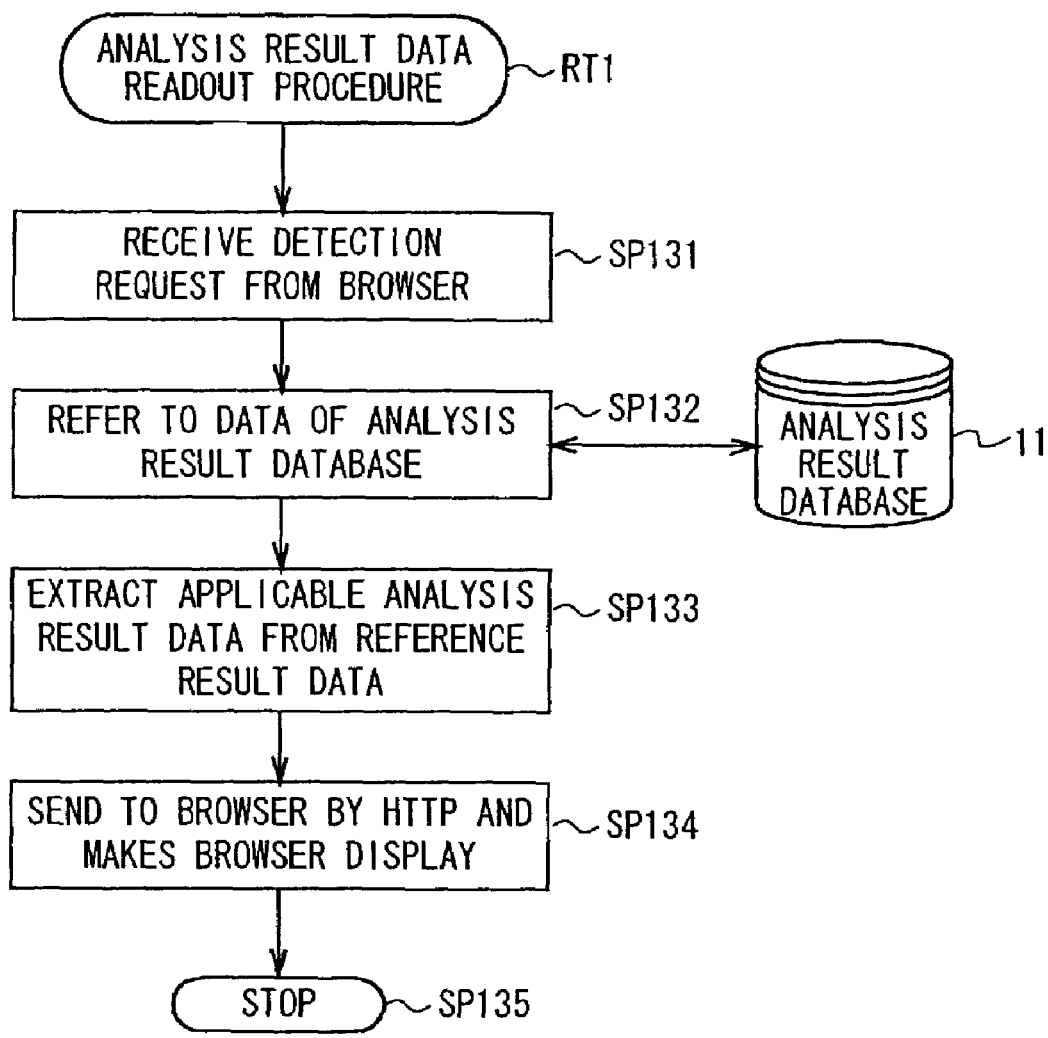
FIG. 21 is a flow chart showing the readout processing procedure of the analysis data.

Moreover, as shown in FIG. 20(A), the terminal devices 3A, 3B . . . send out Request and HTTP header of the HTTP GET request data DATA41 (there is no write-in unit S32 as in the case of FIG. 18) to the HTTP servers 14A, 14B . . . as the HTTP GET request data DATA41.

At this point, as shown in FIG. 20(B), the HTTP servers 14A, 14B . . . transmit the header unit S42 and the main text unit S43 (in this case, still picture) to the terminal devices 3A, 3B . . . that sent out the request as the HTTP GET response data DATA42.

When the CPU 9 enters the HTTP data analysis subroutine, reads out the request data DATA41 from the work memory 10 at the step SP101 continued from the step SP100 (FIG. 15). And at the step SP102, after confirming that the request data has started from which request in the HTTP GET request, HTTP POST request, HTTP HEAD request . . . HTTP CONNECT request, it separates the request data at the step SP103.

Then, at the step SP104, in the case of HTTP POST request, the CPU 9 reads the header unit S31 of the HTTP POST request DATA31. While in the case of HTTP GET request, it reads in the header unit S41 of the HTTP GET request DATA41 (FIG. 20(A)). In this case the request data and response data are transferred by the HTTP (HyperText Transfer Protocol).

Then, at the step SP105, the CPU 9 after changing the HTTP header to the associative array so that each data can be read, judges whether the HTTP header is NULL or not (e.g., whether HTTP header exists or not).

At this point, if an affirmative result is obtained, this means that the terminal devices 3A, 3B . . . sent the request to the HTTP servers 14A, 14B . . . without attaching the HTTP header Host. And at this moment, at the step SP107, by adding "http://addressee IP (Internet Protocol) address/request text", the CPU 9 determines the URL (Uniform Resource Locator), i.e., the resource name to determine the file uniquely, and proceeds to the following step SP108.

On the other hand, if a negative result is obtained at the step SP106, this means that HTTP header Host was attached when the terminal devices 3A, 3B . . . sent the request to the HTTP servers 14A, 14B . . . . And at this moment, at the step SP109, CPU 9 determines "http://HTTP headerHost/Request text" as the URL and moves to the step SP108.

At the step SP108, the CPU 9 reads the response header of the response data. And at the step SP110, it judges whether Content-Length item exists or not in the response header.

At this point, if a negative result is obtained, this means that there is a possibility that only single Web page information is included in the response data. And at this moment, at the step Spill, the CPU 9 reads the response data till the next response header of the file information comes out. And at the step SP112, the CPU 9 determines the main text after the response header to the next response header as one file, and stores this in the analysis result database 11.

On the other hand, if an affirmative result is obtained at the step SP110, this means that there is a possibility that multiple Web page information are included in the response data. And at this moment, the CPU 9 moves to the step SP113 and judges whether Content-Length=0 or not on the Content-Length item.

At this point, if a negative result is obtained, this means that multiple Web pages are included. And at the step SP114, the CPU 9 reads in the data after the response header for Content-Length and moving to the step SP112, stores the data as one file in the analysis result database 11.

Then, at the following step SP115, the CPU 9 judges whether the processing presently being conducted is the case of HTTP POST request or the case of including "?" in the URL or not.

Here, if an affirmative result is obtained, this shows that the contents of Web page information presently being processed are dynamic contents.

More specifically, in the case of POST request, as described above in FIGS. 18 and 19, POST response data DATA32 (FIG. 19) is the data transferred to the HTTP servers 14A, 14B . . . and the data processed corresponding to the contents of the processing write-in unit S32 of the HTTP POST request DATA31 (FIG. 18), and accordingly, it has dynamic contents.

Furthermore, the fact that "?" is included in the contents of URL attached on the step SP107 or SP109 means that the contents of Web page information transmitted to the HTTP servers 14A, 14B . . . have dynamic contents to be changed afterwards.

Accordingly, if a negative result is obtained at the step SP115, this means that the response data is the fixed type Web page information not having dynamic contents. And at this moment, the CPU 9, moving to the step SP116, forms a directory making the data "from URL item to the last/" as one name in the analysis result database 11. And at the following step SP117, the SPU 9, moving the main text data presently being processed to the location of the directory formed from the URL item in the analysis result database 11, and as well as storing this in the analysis result database 11 at the following step SP118, and records Request, Response, URL, the storage location of the main text file in the web*database 11A provided in the analysis result database 11.

Thus, in the case where Content-Length does not exist in the response header (SP110) and in the case where there exists Content-Length but Content-Length is not 0, the analysis result on the Web page not having dynamic contents (step SP115) can be stored in the analysis result database 11.

Figure 17:
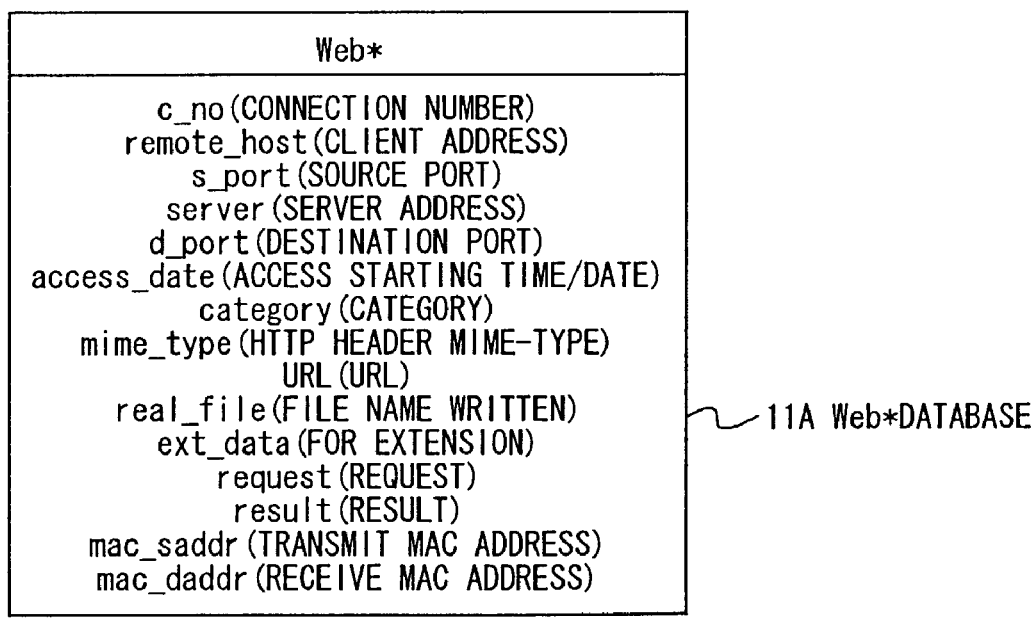
FIG. 17 is a schematic diagram showing the construction of Web*database of FIG. 15 and FIG. 16.

On the other hand, if an affirmative result is obtained at the step SP113, this means that this is a special case, actually the length of Content is 0 even though that the response header has multiple Web pages. And at this moment, the CPU 9 moves to the step SP119, and records Request, Response, URL, main text file in the auxiliary database of the analysis result database 11 (i.e., Web*database 11A) (FIG. 17).

Furthermore, if an affirmative result is obtained at the step SP115, this means that the data presently being processed is using the dynamic contents and not the static contents. And the CPU 9 moving to the step SP119, records Request, Response, URL, main text file in the Web*database 11A.

Thus, at the step SP118 or SP119, since the CPU 9 completes storing the analysis result on the HTTP request header read in at the step SP104 into the analysis result database 11, it moves to the following step SP120 and judges whether any requests still remain or not. And if an affirmative result is obtained, the CPU 9 returning to the step SP103, repeats the processing on the remaining requests.

On the other hand, if a negative result is obtained at the step SP120, this means that the processing on all requests contained in one session has been completed. And at this moment, the CPU 9, moving to the step SP121, judges whether the other session still exists in the work memory 10 or not. And when an affirmative result is obtained, the CPU 9 returns to the step SP101 and repeats the analysis operation of the remaining session.

If a negative result is obtained at the step SP121, this means that the processing of all HTTP data put in the work memory 10 has been completed. And at this moment, the CPU 9 returns to the communication information recording processing procedure RTO (FIG. 2) from the steps SP122.

Furthermore, if a negative result is obtained at the step SP102, this means that the "HTTP data analysis" is not the Web page information to be processed at the step SP8 according to the communication information recording processing procedure RTO (FIG. 2). And at this moment, the CPU 9 immediately returns to the communication information recording processing procedure RTO (FIG. 2) from the step SP122.

(6) Intrusion Detection Analysis Processing Procedure

Figure 22:
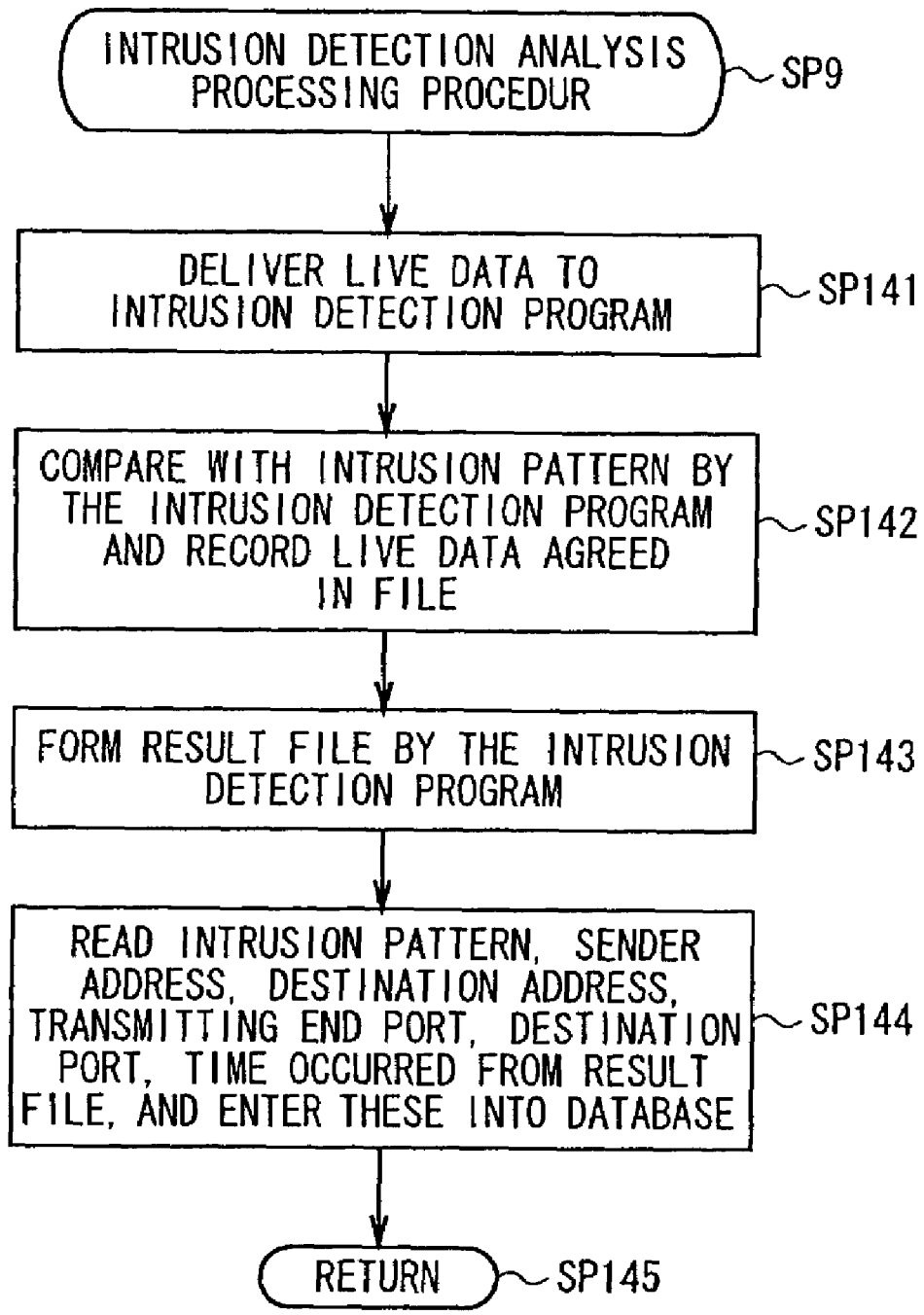
FIG. 22 is a flow chart showing the intrusion detection analysis processing procedure of FIG. 2.

When the CPU 9 of the communication information recording device 6 enters the intrusion detection analysis step SP9 (FIG. 2), it stores the analysis result on the communications passed through the objective network 2 in the analysis result database 11 according to the intrusion detection analysis processing procedure SP9 as shown in FIG. 22.

When the CPU 9 enters the intrusion detection analysis step SP9, it delivers the data stream D0 received at the work memory 10 to the intrusion detection program.

Then next, at the step SP142, the CPU 9, referring the data stream D0 to the intrusion pattern that the intrusion detection program has according to the intrusion detection program, records the agreed data stream D0 in the work memory 11 as a file.

Then, at the step SP143, the CPU 9 extracts the header part and the main text part of the file based in the file recorded on the work memory 11 and forms a result file. Then, at the following step SP144, reading the intrusion pattern, address of transmitting end, address of receiving end, order sender port, order recipient port and the time of occurrence from the result file, the CPU 9 enters these in the analysis result database 11.

With this arrangement, since the communication record of the communication information passed through the objective network 2 could be stored in the analysis result database 11, the CPU 9 returns to the main routine communication information recording processing procedure RT0 from the step SP145.

Thus, according to the communication detection analysis processing procedure of FIG. 22, as to the communication information broke into the objective network 2 without ID, its communication record can be stored in the analysis result database 11. Thus, the analysis result database 11 of the communication information recording device 6 can be read out by using the Web browser 4B of the management headquarter 4 as occasion demands. And thereby the manager of the management headquarter 4 can certainly grasp the communication record of intruders.

(7) Operation of Communication Information Recording Device

According to the foregoing construction, when a packet data on the mail server 4A flows in the objective network 2, the communication information recording device 6 (FIG. 1) attaches the monitor file name in each time when it receives the data and puts in the work memory 10. And in each analysis time (SP2, SP3) at the step SP4, attaching the analysis file name per each session, the communication information recording device 6 executes the processing of the mail data analysis step SP5, or the POP3 server analysis step SP7, or the HTTP data analysis step SP8, and stores the analysis results in the analysis result database 11.

Thus, the manager of the management headquarter 4 can read out the analysis result data stored in the analysis database 11 of the communication information recording device 6 from the Web browser 4B via the objective network 2 as occasion demandsl. Thereby the confirmation of the mail information flowing in the objective network 2 can be certainly conducted after the communication stops.

In the case of conducting such confirmation, when exchanging the mail information between the terminal devices 3A, 3B . . . and the mail server 4A and mail servers 15A, 15B . . . by the mail server analysis step SP5 and the POP3 server data analysis step SP7 of FIG. 2, mail data received will be categorized and stored in the analysis result database 11.

In the case of Web page information, such as the terminal devices 3A, 3B . . . send out requests to the HTTP servers 14A, 14B . . . and receive the responses at the HTTP data analysis step SP8, the Web page information is classified into the static Web page information and the dynamic Web page information. And as to the static Web page information, the storage location of the analysis result database 11 is reassembled to the auxiliary database 11A and will be stored. Accordingly, when a detection request is sent out to the communication information recording device 6 from the Web browser 4B, the detection information required by the manager of the management headquarter 4 can be properly and easily read out enhancing the reproducibility of pages including images with the simple procedure.

(8) Readout of Analysis Result Data

The analysis result data registered in the analysis result database 11 of the communication information recording device 6 will be read out to the Web browser 4B of the management headquarter 4 according to the analysis result data readout processing procedure RT1.

In the analysis result data read-out processing procedure RT1, when the CPU 9 receives a detection request from the Web browser 4B at the step SP131. And referring to the analysis result data of the analysis result database 11 at the step SP132, CPU 9 extracts the analysis result data pertinent to the detection request from the resultant data referred at the step SP133.

Then, the CPU 9 sends the extracted analysis data to the Web browser 4B via the objective network 2 by using the HTP (HyperText Transfer Protocol) at the step SP134 and executes the processing to display this on the display of the Web browser 4B. Then, at the step SP135, the CPU 9 terminates the analysis result data read-out processing procedure RT1.

Figure 13:
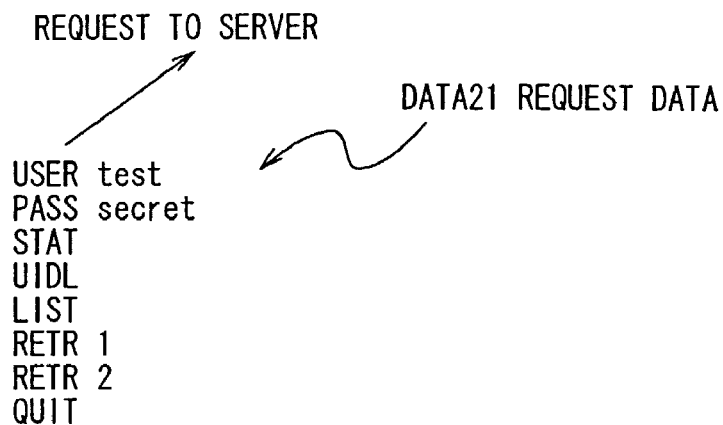
FIG. 13 is a schematic diagram showing the construction of the request data DATA 21 (Request to server) of the POP3.

Thus, according to the analysis result data read-out processing procedure RT1 of FIG. 13 the manager of the management headquarter 4 can always confirm the mail information and the HTTP communication recording passed through the objective network 2 as occasion demands.

(9) Other Embodiment

The embodiment described above has dealt with the case of forming the directory in the analysis result database 11 when "forming the directory using names from the URL to the last "/" at the step SP116 of the "HTTP data analysis" processing procedure SP8 (FIGS. 15 and 16). However, instead of this, an external memory device formed of disc recording device and provided separately from the analysis result database 11 may be used.

INDUSTRIAL UTILIZATION

The present invention can be utilized in the communication system to receive the communication data flowing into the objective network formed by the LAN and to confirm the contents of communications after the communication has been conducted.

The invention claimed is:

1. A communication information recording device, comprising:
    means for sequentially capturing packet data of a data stream traveling on an objective network, at prescribed monitoring time intervals, said packet data transmitted and received by a plurality of terminal devices connected to said objective network, and storing said captured packet data in first memory means with a monitor file name, said captured packet data each being in one of a plurality of application protocols;
    means for reading the packet data stored in the first memory means, based on the monitor file name;
    means for analyzing the packet data read, in order to find communication item data at least including a sender name, a receiver name and a main body of text, in accordance with said one of a plurality of application protocols, and storing analysis result data including the communication item data found in an analysis result database serving as second memory means; and
    means for extracting the analysis result data corresponding to a search request, from the analysis result database, in response to the search request given from the outside, and transmitting the analysis result data extracted to the outside for confirmation of contents of said data packets transmitted to the objective network in the past.

2. The communication information recording device according to claim 1,
    wherein the means for storing stores request data and response data in the analysis result database, and
    wherein the request data is from another communication device to a mail server being connected to the objective network, and the response data is from the mail server to the another communication device.

3. The communication information recording device according to claim 2,
    wherein the means for storing further stores attachment file item data in the analysis result database as the communication item data.

4. The communication information recording device according to claim 2,
    wherein to means for storing further stores a detection result of a computer virus in an attachment file, in the analysis result database as the communication item data.

5. The communication information recording device according to claim 1,
    wherein the means for storing stores header fields data and email message body data in the analysis result database as the communication data.

6. The communication information recording device according to claim 1,
    wherein the means for storing comprises a private database configured to store the communication items of mail information restricted from being read by readers other than specifically identified readers, as private items, and stores the analysis result data while changing to privatize the communication items of the analysis result data that agree with the private items of the private database, so as no to read the communication items changed to private, from the analysis result database.

7. The communication information recording device according to claim 1, wherein the means for storing comprises a category database configured to store category items to categorize communication items, in correspondence with the communication items, and to store the communication items agree with the communication items of the category database, in the analysis result database with the corresponding category items so as to read the analysis result data for each category item.

8. The communication information recording device according to claim 1, wherein the means for storing stores request data and response data in the analysis result database as the communication item data, and wherein the request data is from a terminal device being connected to the objective network, and the response data is from an HTTP server to the terminal device.

9. The communication information recording device according to claim 8, wherein when there exist a Contet-Length item indicating the length of content in the response data from the HTTP server, the means for storing stores the content as a file, stores storage location data indicating a storage location of corresponding communication data in the analysis result database, in a storage location database, and reads the storage location data being stored in the storage location database to outside, so as to reproduce the communication data.

* * * * *